(12) United States Patent
Gilbert et al.

(10) Patent No.: US 12,000,698 B2
(45) Date of Patent: Jun. 4, 2024

(54) POLARIZATION-SEPARATED, PHASE-SHIFTED INTERFEROMETER

(71) Applicant: Massachusetts Institute of Technology, Cambridge, MA (US)

(72) Inventors: Noah Gilbert, Waltham, MA (US); Joshua Brown, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 86 days.

(21) Appl. No.: 17/572,353

(22) Filed: Jan. 10, 2022

(65) Prior Publication Data

US 2023/0160682 A1 May 25, 2023

Related U.S. Application Data

(60) Provisional application No. 63/157,913, filed on Mar. 8, 2021.

(51) Int. Cl.
*G01B 9/02001* (2022.01)
*G01B 9/02* (2022.01)
(Continued)

(52) U.S. Cl.
CPC ....... *G01B 9/0201* (2013.01); *G01B 9/02051* (2013.01); *G01B 9/02067* (2013.01); *G01B 11/2441* (2013.01); *G01B 2290/70* (2013.01)

(58) Field of Classification Search
CPC .............. G01B 9/0201; G01B 9/02027; G01B 9/02067; G01B 2290/60; G01B 2290/70; G01B 2290/35; G01B 2290/40
(Continued)

(56) References Cited

U.S. PATENT DOCUMENTS 5,374,991 A * 12/1994 Atkinson ........... G01B 9/02081
356/493
5,404,224 A 4/1995 Kotidis et al.
(Continued)

OTHER PUBLICATIONS

Rerucha, Simon et al. "Compact differential plane interferometer with in-axis mirror tilt detection". Optics and Lasers in Engineering, 141, 106568, Feb. 15, 2021. (Year: 2021).*
Abdulhalim et al. "Real time parallel phase shift orthogonal polarization interference microscopy." Interferometry XVIII. vol. 9960. SPIE, 2016, 7 pages.
Brock et al., "Dynamic Interferometry," Novel Optical Systems Design and Optimization VIII. vol. 5875. SPIE, 2005, 11 pages.
(Continued)

*Primary Examiner* — Michael A Lyons
(74) *Attorney, Agent, or Firm* — Smith Baluch LLP

(57) ABSTRACT

A polarization-separated, phase-shifted interferometer can generate interferograms without moving parts. It uses a phase shifter, such as an electro-optic phase modulator, to modulate the relative phase between sample and reference beams. These beams are transformed into orthogonal polarization states (e.g., horizontally and vertically polarized states) and coupled via a common path (e.g., polarization-maintaining fiber) to a polarizing beam splitter (PBS), which sends them into separate sample and reference arms. Quarter-wave plates in the sample and reference arms rotate the polarization states of the sample and reference beams so they are coupled out of the PBS to a detector via a 45° linear polarizer. The polarizer projects the aligned polarization components of the sample and reference beams onto the detector, where they interfere with known relative phase to produce an output that can be used to map surface topography of the test object.

18 Claims, 16 Drawing Sheets

(51) Int. Cl.
  *G01B 9/02055* (2022.01)
  *G01B 11/24* (2006.01)
(58) Field of Classification Search
  USPC .......................................................... 356/495
  See application file for complete search history.

(56) References Cited

U.S. PATENT DOCUMENTS

| | | | |
|---|---|---|---|
| 6,304,330 | B1 | 10/2001 | Millerd et al. |
| 6,552,808 | B2 | 4/2003 | Millerd et al. |
| 7,057,737 | B2 | 6/2006 | Millerd et al. |
| 7,079,251 | B2 | 7/2006 | Millerd et al. |
| 7,230,717 | B2 | 6/2007 | Brock et al. |
| 7,230,718 | B2 | 6/2007 | Millerd et al. |
| 7,317,539 | B2 | 1/2008 | Pasch |
| 7,483,145 | B2 | 1/2009 | Szwaykowski et al. |
| 7,561,279 | B2 | 7/2009 | Castonguay et al. |
| 7,580,135 | B2 | 8/2009 | Hayes |
| 7,675,628 | B2 | 3/2010 | Millerd et al. |
| 7,777,895 | B2 | 8/2010 | Medower et al. |
| 8,351,048 | B2 | 1/2013 | Millerd |
| 9,746,316 | B1 | 8/2017 | Kimbrough et al. |
| 9,857,169 | B1 | 1/2018 | Morris et al. |
| 10,422,624 | B2 * | 9/2019 | Matsuura ............ G01B 11/2441 |
| 11,137,556 | B2 * | 10/2021 | Janssen ................ G02B 6/4287 |
| 2006/0250618 | A1 * | 11/2006 | Kawasaki ........... G01B 11/2441 356/512 |
| 2007/0211256 | A1 | 9/2007 | Medower et al. |
| 2007/0296978 | A1 | 12/2007 | Hayes |
| 2008/0062428 | A1 | 3/2008 | Millerd et al. |
| 2010/0134801 | A1 | 6/2010 | Millerd et al. |
| 2010/0309476 | A1 | 12/2010 | Millerd |
| 2011/0051146 | A1 * | 3/2011 | Jensen ................ G01B 9/02004 356/493 |
| 2016/0313112 | A1 * | 10/2016 | Yamanari ........... G01B 9/02075 |
| 2017/0016711 | A1 * | 1/2017 | Kawasaki .......... G01B 9/02027 |
| 2018/0128593 | A1 * | 5/2018 | Kawasaki .......... G01B 9/02079 |

OTHER PUBLICATIONS

Chang et al. "Parallel polarization phase-shifting interferometry with a multi-loop Sagnac configuration." Optik 127.20 (2016): 10122-10126.
Creath, "V phase-measurement interferometry techniques." Progress in optics. vol. 26. Elsevier, 1988. 349-393.
Dubois, "Phase-map measurements by interferometry with sinusoidal phase modulation and four integrating buckets." Josa A 18.8 (2001): 1972-1979.
Gray et al., "External phase-modulation interferometry," Appl. Opt. 35, 1623-1632 (1996).
Greivenkamp, "Generalized data reduction for heterodyne interferometry." Optical Engineering 23.4 (1984): 234350. 3 pages.
Hu, "Polarization heterodyne interferometry using a simple rotating analyzer. 1: Theory and error analysis." Applied optics 22.13 (1983): 2052-2056.
Juarez-Salazar et al., "How do phase-shifting algorithms work?. " European Journal of Physics 39.6 (2018): 065302, 21 pages.
Liu et al. "Surface profile measurement by using stabilized polarization interferometer module." CLEO/Europe. 2005 Conference on Lasers and Electro-Optics Europe, 2005.. IEEE, 2005, 1 page.
Neal et al., "Polarization phase-shifting point-diffraction interferometer." Applied optics 45.15 (2006): 3463-3476.
Nomura et al. "Wave-splitting phase-shifting digital holography by use of a retarder array." LEOS 2007—IEEE Lasers and Electro-Optics Society Annual Meeting Conference Proceedings. IEEE, 2007, 2 pages.
Shagam et al. "Optical frequency shifter for heterodyne interferometers using multiple rotating polarization retarders." Applied optics 17.19 (1978): 3034-3035.
Totzeck, et al. "Inspection of sub-wavelength structures and zero-order gratings using polarization interferometry." Interferometry XI: Techniques and Analysis. vol. 4777. SPIE, 2002, 16 pages.
Wildermuth et al. "Interrogation of birefingent fiber sensors using non-reciprocal phase modulation." 20th International Conference on Optical Fibre Sensors. vol. 7503. SPIE, 2009, 5 pages.
Wyant, "Short History of Interferometric Optical Metrology." Frontiers in Optics. Optical Society of America, 2016, 2 pages.

* cited by examiner

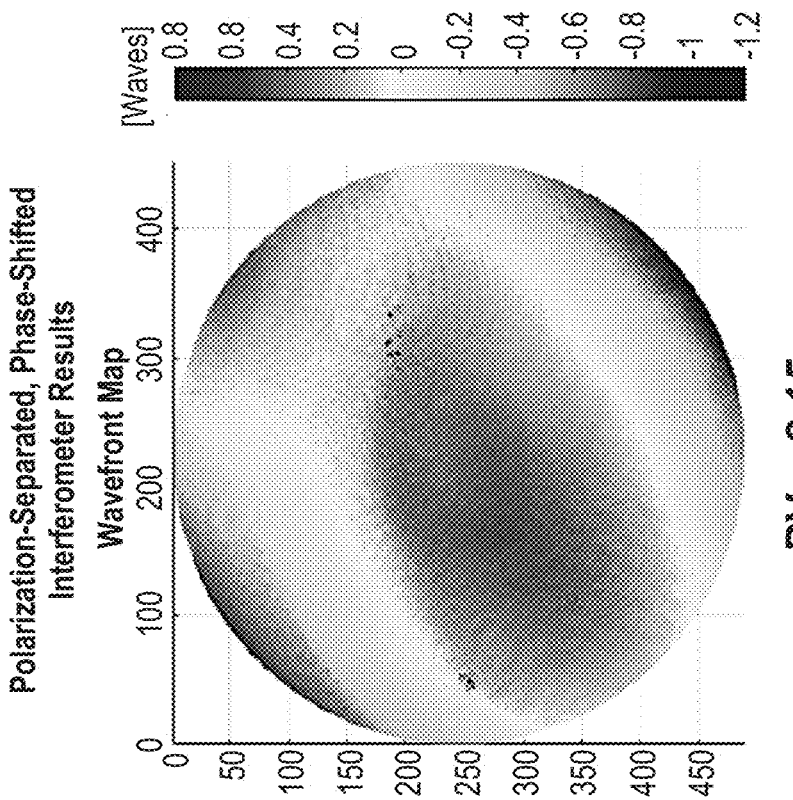
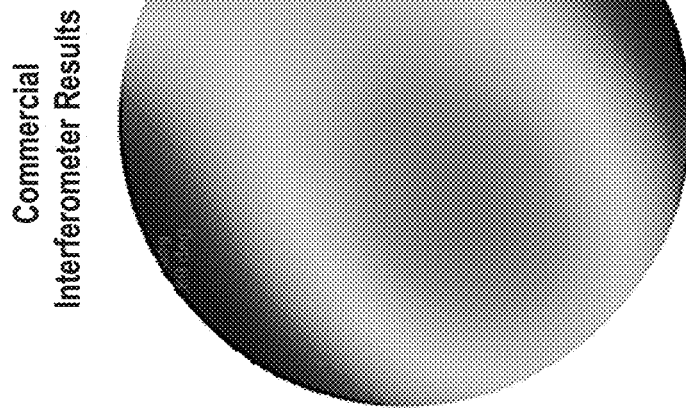
FIG. 6B
FIG. 6A

POLARIZATION-SEPARATED, PHASE-SHIFTED INTERFEROMETER

CROSS-REFERENCE TO RELATED APPLICATION(S)

This application claims the priority benefit, under 35 U.S.C. § 119(e), of U.S. Application No. 63/157,913, filed Mar. 8, 2021, which is incorporated herein by reference in its entirety for all purposes.

GOVERNMENT SUPPORT

This invention was made with government support under FA8702-15-D-0001 awarded by the U.S. Air Force. The government has certain rights in the invention.

BACKGROUND

Interference of light as a useful phenomenon has been known since the time of Sir Isaac Newton. Newton observed in 1666 concentric ringing interference patterns between flat and curved glass elements. This phenomenology lent early credence to the description of light as a wave phenomenon. In the years since, the observation and harnessing of optical interference phenomenology has progressed significantly, spurred by the technical progress of the industrial revolution. In the mid-19th century, Hippolyte Fizeau, a French engineer, mathematician, and astronomer, invented a configuration subsequently known as a Fizeau interferometer, where light passes through a reference surface before reflecting off a surface under test that is nominally confocal to the reference surface. Shortly thereafter, Albert Michaelson contributed to the field of interferometry by splitting the arms of the interferometer, allowing a reference arm and test arm to be totally separate. This was used in the famous Michaelson-Morley experiment, which did not detect luminiferous ether, laying the foundations for the discovery of special relativity. Frank Twyman and Arthur Green refined the Michaelson interferometer in the early 20th century, and their design remains the foundation of most conventional tabletop non-Fizeau interferometers.

The introduction of lasers in the 1960s again pushed optical interferometry forward as a science. A laser represents a genuinely high-intensity point source. The laser allowed for longer coherence lengths than previous technologies, which meant that interference could occur between beams of the same relative phase from the same source, without having to have an absolute phase match. With this innovation, the style of Twyman-Green interferometer known as the laser unequal path interferometer (LUPI) was conceived. A LUPI allows for an arbitrary distance to the part under test and a short arm to a reference mirror.

FIG. 1A shows how a conventional LUPI 100 can be used to map surface height. This LUPI is in a Michelson geometry and includes a laser 102 that illuminates a beam splitter 106 with a collimated laser beam via a collimating lens 104. The beam splitter 106 splits the collimated laser beam into the two parts, with one part going to a reference arm with a moving mirror (here, a mirror 110 on a piezoelectric transducer (PZT) 112) and the other part going to a sample arm with a unit under test (UUT) 120. The mirror 110 in the reference arm and the UUT 120 reflect light back to the beam splitter 106, which directs the reflected light via an imaging lens 130 to a detector 132 (here, a charge-coupled device (CCD) camera). The reflected light interferes to produce an intensity fringe pattern 140 sensed by the detector 132 as shown at upper right.

The fringes in the fringe pattern 140 can be analyzed to determine differences in the surface height of the UUT 120 with respect to the reference mirror 110. For example, a surface map 145 can be generated to plot deviations from flatness of the surface of the UUT 120. Unfortunately, the fringes are ambiguous in direction due to phase wrapping; that is, phase delays of $2\pi$ radians are indistinguishable from other phase delays that are integer multiples of $2\pi$ radians. As a result, it is not clear if the analysis of the fringes indicates peaks or valleys on the surface of the UUT 120. There is no way, in a static image, to say that concentric fringes represent a peak or a valley, nor concentric undulating features (e.g., ripples in the surface).

FIG. 1B shows that moving the mirror 110 in the reference arm by a known amount with the piezoelectric actuator 112 breaks this phase wrapping ambiguity by shifting the relative phase between the reference and sample arms. When the mirror 110 moves, the phase moves by twice the distance moved by the mirror 110, based on doubled path length on reflection. The detector 132 acquires images of the fringe pattern at each of several positions, where each position corresponds to a different known relative phase delay that is less than $2\pi$. Changing this relative phase provides knowledge of the sign of the local phase slope. Generally, the detector 132 takes at least three or four images for reconstructing the phase front. FIG. 1C shows an example surface plot for a UUT 120 that has three peaks and two valleys and corresponding examples of the individual fringe pattern images (interferograms), with each at a different relative phase. While not immediately apparent in a single static image, the four interferograms show concentric interference rings moving "inwards" for concave features in the surface of the UUT and "outwards" for convex features in the surface.

FIG. 1D shows a map of the surface of the UUT formed by processing the images in FIG. 1C to recover phase information based on the movement of the piezo-actuated mirror 110. The fringes are gone, but phase discontinuities remain because phase differences of 0 and $2\pi$ remain indistinguishable. The phase discontinuities can be eliminated to produce the surface map in FIG. 1E using phase healing. Generally, phase maps are healed by taking image intensity derivative maps, summing the total, and then minimizing this value to remove the $2\pi$ phase jumps. Phase healing yields an unwrapped phase image that represents the best approximation of the input phase disturbance introduced by the surface of the UUT.

SUMMARY

The inventors have recognized and appreciated that piezoelectric actuators have a number of drawbacks, including sensitivity to externally induced vibration and temperature shifts. The piezoelectric actuator should move the reference mirror very precisely distance at high speed, e.g., over a distance of about 1 µm with a precision of a few nanometers. If the mirror is not at the expected position when the camera obtains an image of the interference fringes, then the wrong phase delay may be applied during phase reconstruction. This effect applies to any non-common-path part of the LUPI; surfaces that can create phase error from vibration (for example, a diverging lens) can also introduce undesired phase shifts. Additionally, mechanical disturbances can create lateral shifts from frame to frame, decreasing the lateral resolution of the interferogram and creating a misregistration. Thermal gradients can also change a piezoelectric crystal's motion, or laterally move components, albeit at a slower speed than some mechanical vibrations.

Another disadvantage of piezoelectric transducers is their low actuation rate, which is typically on the order of a kilohertz at most. While this is fast relative to most cameras, it is too slow to provide genuine high-rate interferometry. The time between frames provides an opportunity for environmental perturbations to influence results. Most piezoelectric transducers are driven with voltage ramps that sweep the position over time as opposed to stepped waveforms that move the piezoelectric transducers among discrete positions. Voltage ramps provide a more stable linear relation to phase with respect to time but incur some error in measurement to the ramp operating over the integration time of a frame.

Other disadvantages of piezoelectric modulation include the need for high actuation voltages (e.g., hundreds of volts), bulk, weight, and stiffness. Piezoelectric crystals typically require high voltages to be generated and applied across the crystal; high-voltage supplies are challenging to miniaturize. A piezoelectric transducer is challenging to miniaturize too because it moves by expanding and contracting, with its absolute movement range set by its size and percentage expansion and contraction. In addition, the relative stiffness of the piezoelectric transducer limits the precision with which the reference mirror can be moved. Because the reference mirror in a LUPI moves back and forth, it is typically not rigidly affixed to anything except the piezoelectric transducer. The relative stiffness of the piezoelectric transducer therefore sets an upper bound as to the alignment accuracy of the reference mirror.

The inventors have further recognized and appreciated that electro-optic phase modulators can induce phase shifts at extremely high speeds and without moving parts, overcoming several of the drawbacks of piezoelectric transducers. An electro-optic phase modulator includes an electro-optic crystal (e.g., lithium niobate) whose index of refraction can be modulated by a voltage according to the Pockels non-linear effect. The difference in index of refraction changes the overall optical phase delay, introducing phase shift.

However, free-space electro-optic phase modulators tend to be bulky and take high actuation voltages. Electro-optic crystals are also hard to make with good spatial homogeneity. Electro-optic crystals are often much longer than they are wide to build up sufficient phase delay, compounding problems associated with spatial inhomogeneity. This effect is not necessarily static, either; these inhomogeneities can create different phase shifts per volt due to free carrier mobility and are very sensitive to absolute and relative thermal variations.

Fiber-coupled electro-optic phase modulators, on other hand, tend to be small and spatially homogeneous and can be actuated at Gigahertz rates with just a few volts (e.g., <10 V). Fiber electro-optical modulation is used extensively in optical communications modems. Fiber-coupled electro-optic phase modulators are very reliable and relatively inexpensive. The single-mode fiber that couples to and from the electro-optic crystal washes out spatial inhomogeneity, which is already low due to the small size of the electro-optic crystal.

Described herein is a polarization-separated, phase-shifted interferometer that addresses the shortcomings of conventional LUPIs by eliminating moving reference mirrors or phase-modulating components in a Michaelson interferometer. The interferometer can be implemented with a light source that is separated from an interference head in which the unit under test is optically analyzed. The interference head can include a polarizing beam splitter (PBS), first and second quarter-wave plates (QWPs), a polarization analyzer, and a detector. In operation, the light source generates a sample beam in a first polarization state and a reference beam in a second polarization state orthogonal to the first polarization state. The reference beam co-propagates with and is phase-modulated (e.g., phase shifted to discrete phase steps) with respect to the sample beam. The phase-modulated reference beam and sample beam are then provided to the interference head.

Some implementations relate to an interferometric measurement apparatus that comprises a light source to generate a reference beam in a first polarization state and a sample beam in a second polarization state orthogonal to the first polarization state and having a phase modulator to shift the phase of the reference beam with respect to the sample beam. The interferometric measurement apparatus can further include an interference head to receive the reference beam and the sample beam and to interfere the sample beam with the reference beam after propagating the reference beam along a first optical path and the sample beam along a second optical path in the interference head.

The PBS has four ports. The first port is in optical communication with the light source and receives the sample beam. The second port directs the sample beam along a sample arm and receive the sample beam from the sample arm. The third port directs the reference beam along a reference arm and receives the reference beam from the reference arm. And the fourth port outputs the sample beam and the reference beam as co-propagating beams.

The first QWP is in the sample arm and transforms the sample beam from the first polarization state to the second polarization state upon reflection of the sample beam off a surface of a unit under test. Similarly, the second QWP is in the reference arm and transforms the reference beam from the second polarization state to the first polarization state upon reflection of the sample beam off a static mirror at an end of the reference arm. The polarization analyzer is in optical communication with the fourth port of the PBS and projects the sample and reference beams into a third polarization state. And the detector is in optical communication with the polarization analyzer and detects interference of the sample beam and the reference beam.

The PBS, first and second QWPs, static mirror, polarization analyzer, and detector can be assembled in a monolithic assembly.

The light source may include a laser, a first PBS, a phase modulator (e.g., an electro-optic phase modulator), and a second PBS. The laser emits a laser beam. The first PBS is in optical communication with the laser and splits the laser beam into the sample beam and the reference beam. The phase modulator is in optical communication with the first PBS and modulates a phase of the reference beam relative to the sample beam. And the second PBS is in optical communication with the first PBS and the phase modulator and directs the sample beam and the reference beam to a common output (the first port of the PBS). The laser, first and second PBSs, and phase modulator can be fiber-coupled.

Some implementations relate to a method of operating an interferometric measurement apparatus, the method comprising: generating, with a light source, a reference beam in a first polarization state and a sample beam in a second polarization state orthogonal to the first polarization state; shifting the phase of the reference beam with respect to the sample beam with a phase modulator in the light source before providing the reference beam and the sample beam to an interference head of the interferometric measurement apparatus; directing, in the interference head, the reference beam along a first optical path that includes a mirror; directing, in the interference head, the sample beam along a second optical path that includes a unit under test; and interfering the reference beam returned from the mirror with the sample beam returned from the unit under test.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6A shows a surface map of a test object obtained using a commercially available interferometer.

FIG. 6B shows a surface map of the test object of FIG. 6A obtained using a polarization-separated, phase-shifted interferometer.

DETAILED DESCRIPTION

Figure 1A:
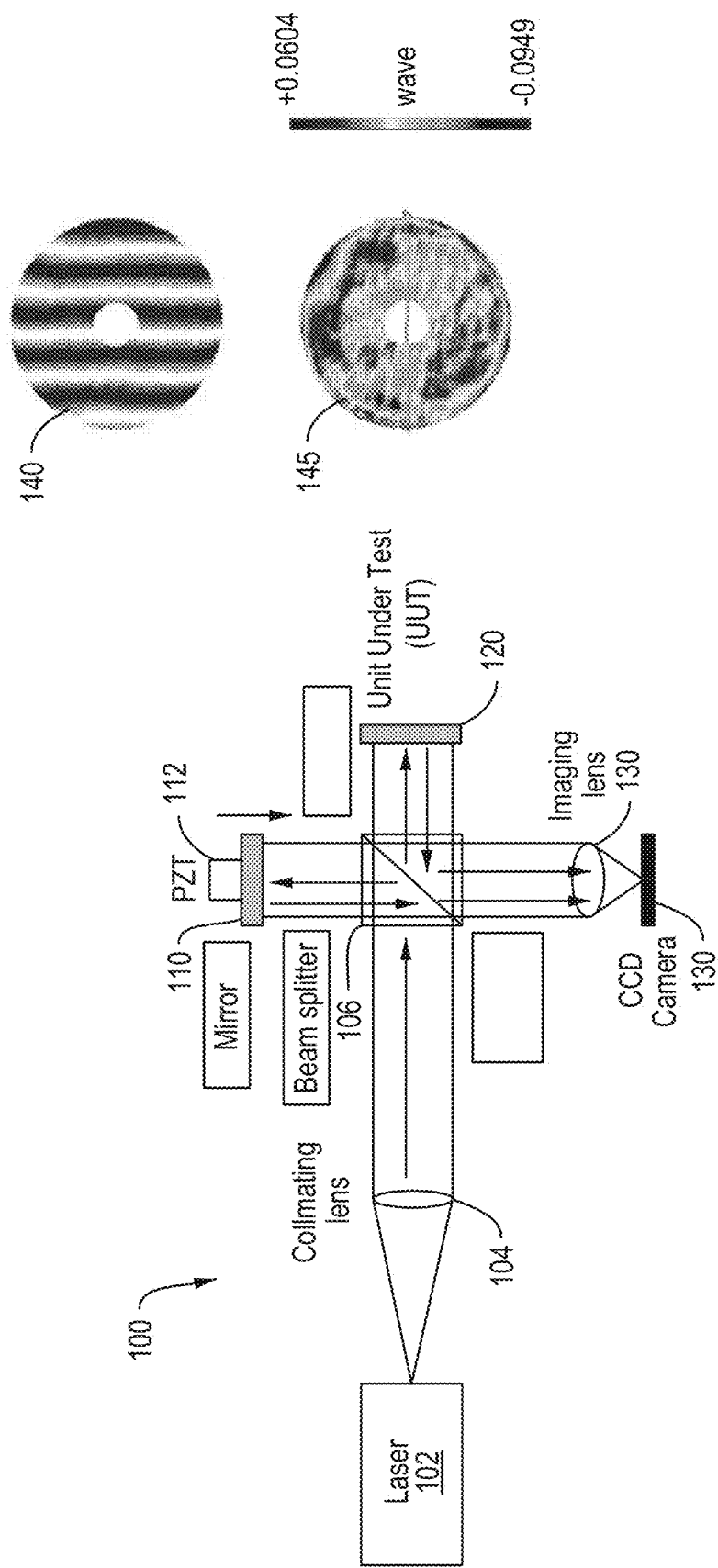
FIG. 1A illustrates operation of a conventional laser unequal path-length interferometer (LUPI).
Figures 1B, 1C:
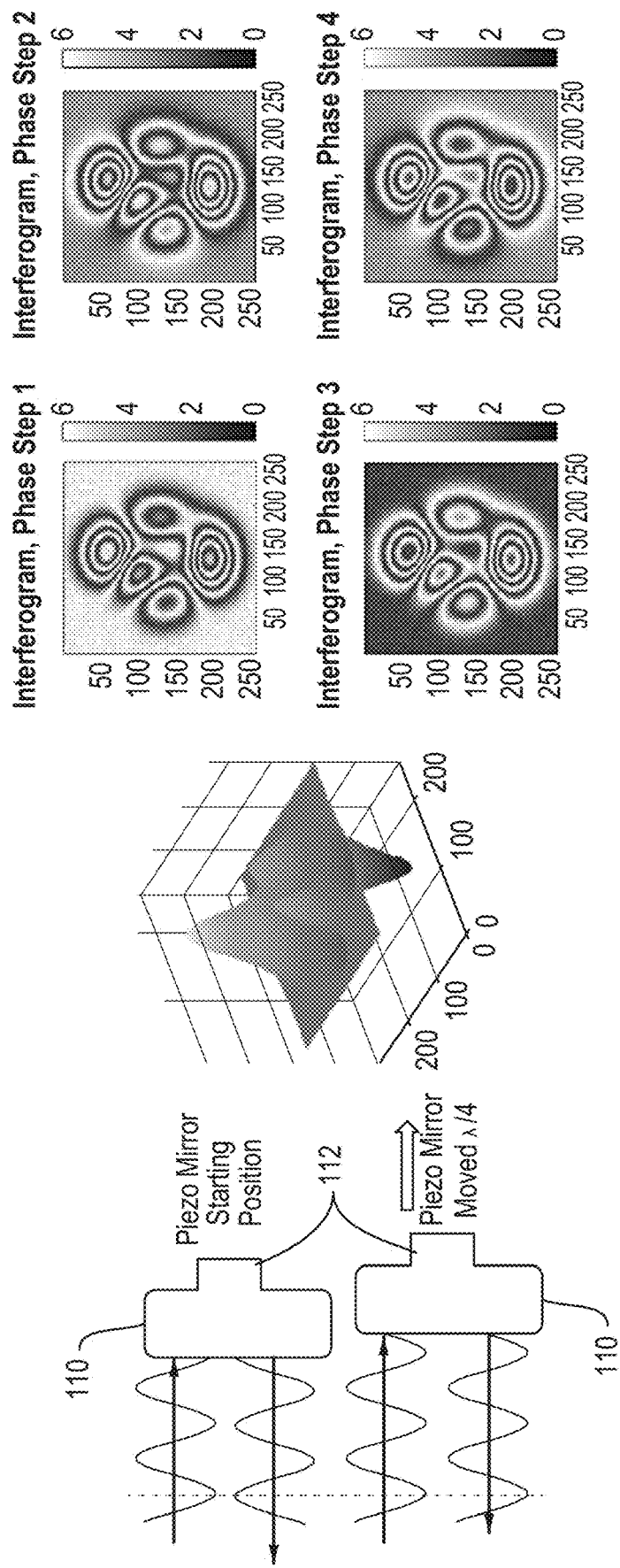
FIG. 1B shows how the reference mirror and piezoelectric transducer move in the LUPI in FIG. 1A.
FIG. 1C shows an example surface plot and corresponding interferograms captured by the LUPI in FIG. 1A for different reference mirror positions (phase delays).
Figures 1D, 1E:
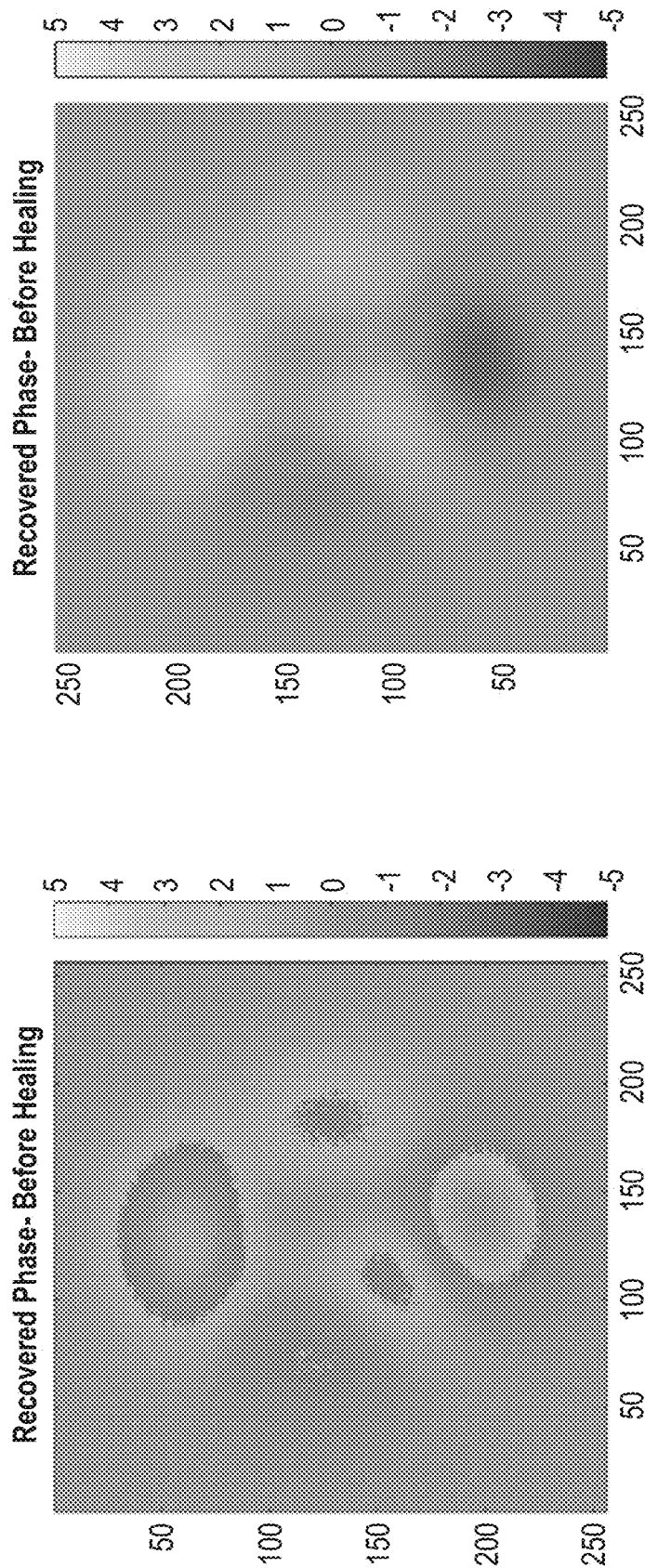
FIG. 1D shows a map of the surface of the unit under test derived from the interferograms of FIG. 1C, with contrast reversals indicating phase discontinuities.
FIG. 1E shows the map of FIG. 1D after phase healing.
Figure 2A:
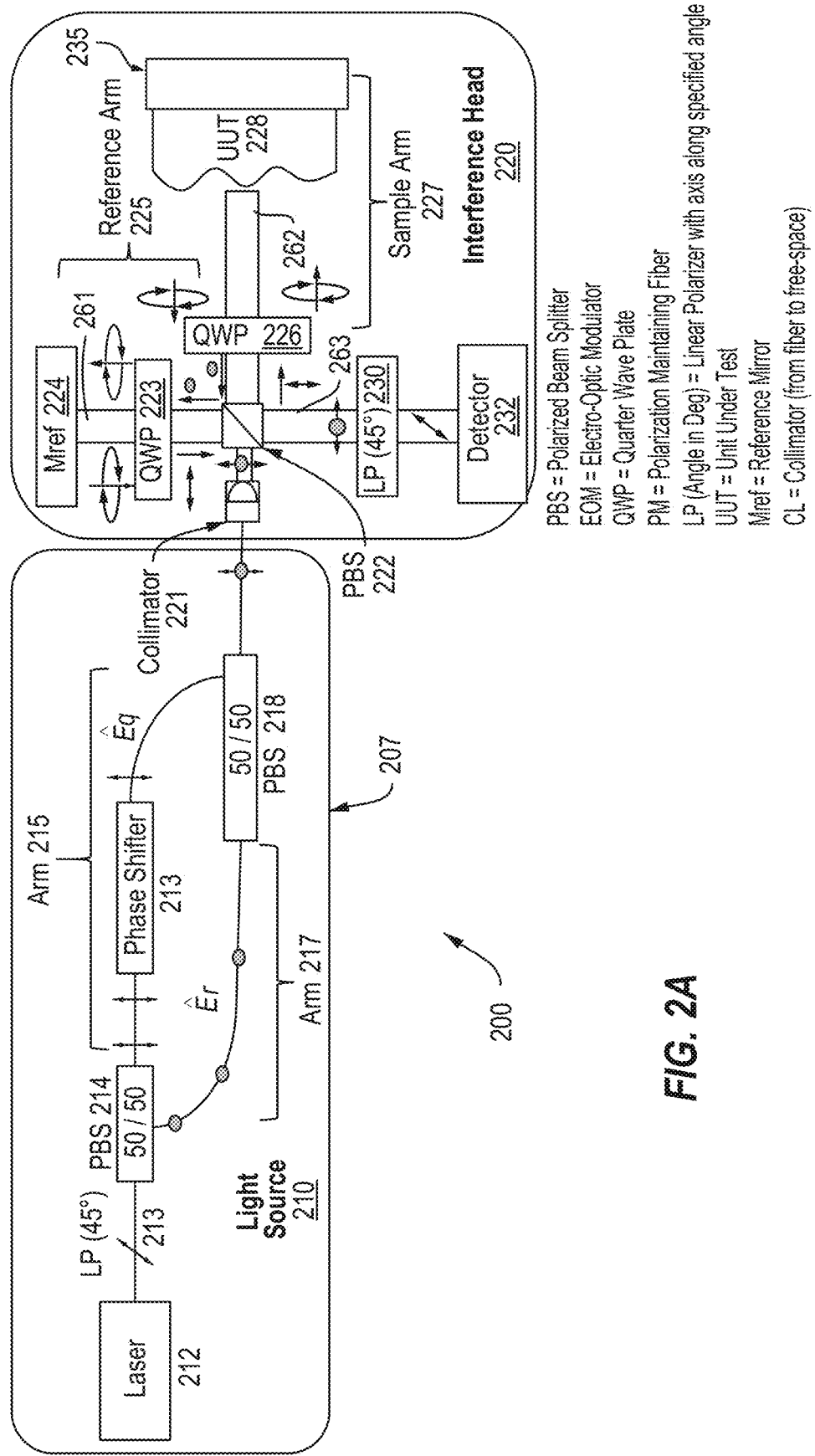
FIG. 2A shows an inventive polarization-separated, phase-shifted interferometer with a fiber-based light source and a free-space interference head.

FIG. 2A illustrates an inventive polarization-separated, phase-shifted interferometer 200 that addresses many of the shortcomings of the conventional LUPI 100 described in connection with FIGS. 1A-1E. Like the conventional LUPI, the polarization-separated, phase-shifted interferometer 200 features, in part, a Michelson-type interference head 220 with a separate reference arm 225 and sample arms 227. Unlike a conventional LUPI, the polarization-separated, phase-shifted interferometer 200 does not include a moving mirror at the end of the reference arm 225 (nor any other phase-modulating component in either the reference arm 225 or sample arm 227) to break the phase-wrap ambiguity in the detected fringe pattern. Instead, it uses orthogonally polarized, dynamically phase-shifted beams to generate a fringe pattern representing the surface height of a unit under test (UUT). These beams are generated without any moving parts and with phase modulation that can reach MHz and even GHz rates. Such high-speed modulation can minimize any adverse effects from environmental disturbances. Further, the high-speed dynamic phase shifting allows the phase to be stepped to discrete phase settings quickly and held constant for imaging of the fringe patterns.

The polarization-separated, phase-shifted interferometer in FIG. 2A includes a light source 210 coupled to a free-space interference head 220. The light source 210 includes a fiber-coupled laser 212 that emits polarized light. The polarized light emitted by the laser 212 can be linearly polarized at 45 degrees with respect to a reference axis or in any other suitable polarization state and can be at a wavelength from 1525 nm to 1580 nm, though other wavelengths can be used. The laser 212 can emit light at a single wavelength; at multiple wavelengths, either sequentially or simultaneously; or in a swept or tunable manner, depending on the measurement. This polarized light can be coupled into polarization-maintaining (PM) fiber 213 along the fast or slow axis. In some cases, the coupling into the PM fiber 213 can be accomplished with a PM 50:50 amplitude splitter and a half-twist (fast axis to slow axis change) fiber or wave plate to produce two orthogonal polarization states in the PM fiber 213.

A fiber-coupled polarized beam splitter PBS 214 splits the amplitude of the incident polarized light into two orthogonal states $\hat{E}_q$ and $\hat{E}_r$ where $\hat{E}_q^\dagger \cdot \hat{E}_r = 0$. For example, the two polarization states can be horizontal and vertical linear polarization states. In the fiber system, these states are typically oriented along the fast and slow axes of the PM fiber. The PBS 214 directs the $\hat{E}_q$ and $\hat{E}_r$ states separately into first and second arms 215, 217 of a fiber splitter/combiner 207.

A fiber-coupled phase shifter 216 in the first arm 215 of the fiber splitter/combiner 207 modulates the phase of the $\hat{E}_q$ polarized output, e.g., along the fast axis at a desired modulation rate up to MHz or even GHz without any mechanically moving parts. This phase shifter 216 can be driven by an arbitrary waveform generator or other suitable driver that either controls or is synchronized with interferogram acquisition to produce the desired phase shift. Suitable fiber-coupled phase shifters include electro-optic modulators (EOMs; e.g., Pockels or Kerr cells), acousto-optic modulators (AOMs), fiber stretchers, thermal index modifiers, liquid-crystal wave plates, and optical trombones. A second fiber-coupled PBS 218 combines the phase-shifted, $\hat{E}_q$ polarized beam with the $\hat{E}_r$ polarized beam from the second arm 217 into a single output that is coupled to the interference head 220. The phase-modulated $\hat{E}_q$ beam and unmodulated $\hat{E}_r$ beam do not interfere in the fiber due to the orthogonal nature of their polarization states.

Figure 2B:
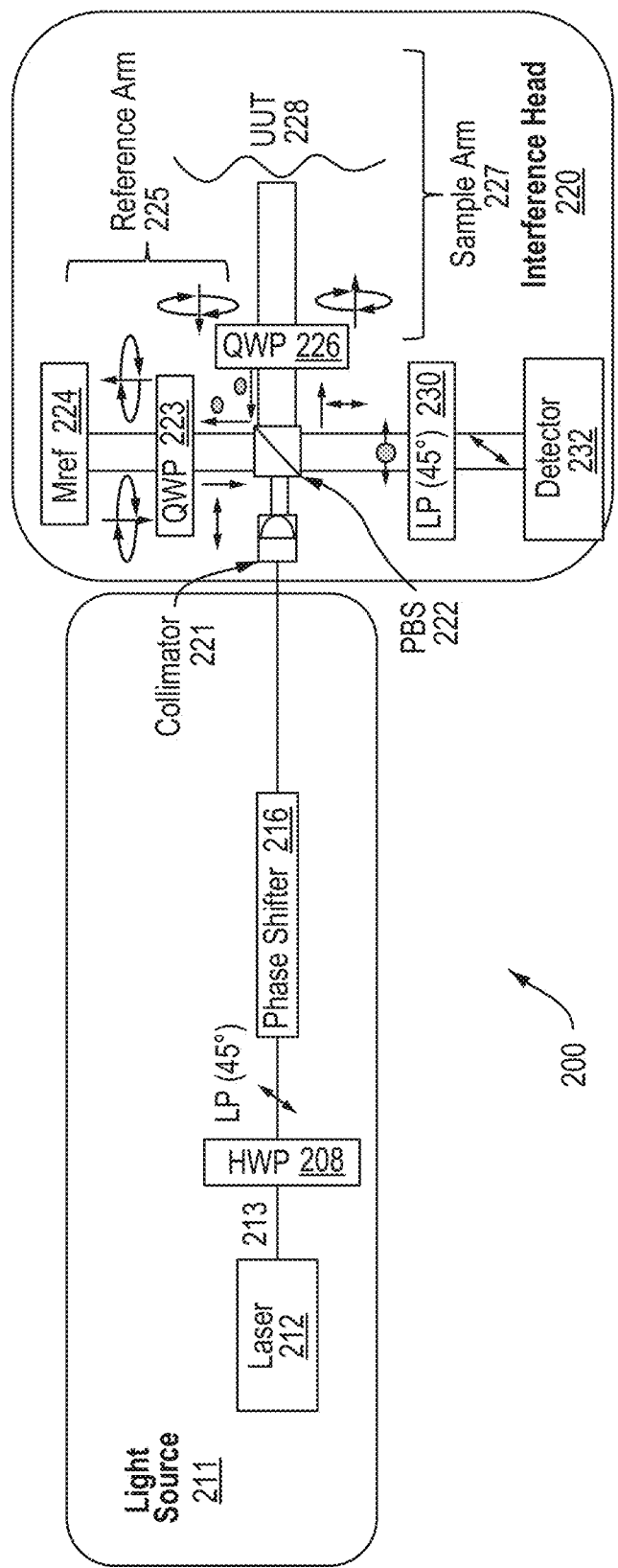
FIG. 2B shows an inventive polarization-separated, phase-shifted interferometer with a fiber-based light source that does not include beam splitters and a free-space interference head.

The light source 210 in FIG. 2A has the EOM 214 in one arm of the splitter/combiner 207. In principle, however, EOMs or phase shifters can modulate light in one polarization state (e.g., horizontally polarized light) without modulating light in the orthogonal polarization state (e.g., vertically polarized light) that passes through the EOM. This means that for some implementations, the light source need not include beam splitting and combining. Instead and as depicted in FIG. 2B, the light source 211 can have laser 212 that is coupled to a phase shifter 216, possibly via a half wave plate 208 to adjust polarization going into the EOM. The output from the EOM can then be provided to the interference head 220 without being combined by a beam splitter with output from another fiber in the light source. In this configuration, the light from the laser can be linearly polarized at 45° with respect to a modulation axis of the EOM or circularly polarized. The EOM resolves this 45° diagonally polarized light or circularly polarized light into equal amounts of vertically and horizontally polarized components. (For polarization components of different amplitudes, the input can be elliptically polarized or linearly polarized at an angle other than 45°.) The EOM can modulate the phase of one component relative to the phase of the other component and pass both components, via the same waveguide (optical fiber), to the interference head 220. Because the polarization components are orthogonal, they do not interfere with each other. Although the implementations of FIG. 2A and FIG. 2B depict the orthogonal polarizations as copropagating when exiting the light source 210, 211, in some implementations they may not be copropagating. For example, beam-combining optics can be located in the interference head 220.

The interference head 220 includes a collimating lens 221 that couples the co-propagating $\hat{E}_q$ and $\hat{E}_r$ (fast and slow axes, respectively) polarized beams into free space. The collimating lens 221 transforms the 1D phase fronts of the co-propagating waves in the fiber to nearly plane waves with larger transverse spatial extent. The beams continue co-propagating to a third PBS 222, which reflects the phase-modulated, $\hat{E}_q$ polarized beam (which can be denoted as B1$_q$) into a reference arm 225 along a first optical path 261. The first optical path extends from the PBS 222 to the mirror 224 which folds the optical path 261 back to the PBS 222. Although the third PBS is depicted as a cube (an optic having four faces or four ports), it can be a plate polarizing splitter is some implementations (an optic having two faces or two ports). The phase-shifted, $\hat{E}_q$ polarized beam propagates through a quarter-wave plate (QWP) 223 aligned to introduces a 90° relative phase shift between analyzed polarization components of the $\hat{E}_q$ polarized beam (e.g., changing the polarization to circular). The phase-modulated beam then reflects off a static reference mirror 224 and propagates back through the QWP 223 again, which introduces another 90° relative phase shift for a total relative phase shift of 180°. This changes the polarization state of the phase-shifted, $\hat{E}_q$ polarized beam to the $\hat{E}_r$ polarization state. The third PBS 222 transmits this phase-modulated $\hat{E}_r$ polarized beam (which can be denoted as B1$_r$) through a diattenuator 230 (here, a 45° linear polarizer (LP)) aligned to pass components of both $\hat{E}_q$ and $\hat{E}_r$, transforming the polarization state to $\hat{E}_u$ where $\hat{E}_u \neq \hat{E}_q$, $\hat{E}_r$, $\hat{E}_q^\dagger \cdot \hat{E}_q \neq 0$, and $\hat{E}_q^\dagger \cdot \hat{E}_r \neq 0$. The linear polarizer 230 can be rotated to account for any amplitude mismatch between the orthogonally polarized reference and sample beams. The beam then propagates to an observation plane containing a detector array 232, such as a CCD or CMOS imaging array.

The third PBS 222 also transmits the $\hat{E}_r$ polarized beam (which can be denoted as B2$_r$) into a UUT arm or sample arm 227 along a second optical path 262. The second optical path extends from the PBS 222 to the UUT 228 and folds back to the PBS 222 by reflection from the UUT. Like the reference arm 225, the sample arm 227 includes a QWP 226 aligned to introduce a 90° relative phase shift from the $\hat{E}_r$ state. The beam reflects off the surface of the UUT 228 and propagates through the QWP 226 again, imparting another 90° relative phase shift for a total relative phase shift of 180°. This 180° relative phase shift rotates the polarization state of the unmodulated beam from $\hat{E}_r$ p to $\hat{E}_q$. The third PBS 222 reflects the $\hat{E}_q$ polarized beam (which can be denoted as B2$_q$) to the observation plane through the diattenuator 230, transforming the polarization state to $\hat{E}_u$ where $\hat{E}_u \neq \hat{E}_q$, $\hat{E}_r$, $\hat{E}_u^\dagger \cdot \hat{E}_q \neq 0$, and $\hat{E}_q^\dagger \cdot \hat{E}_r \neq 0$. The beams B1$_r$, B2$_q$ from the reference arm 225 and the sample arm 227 are combined in an output optical path 263 by the PBS and transformed by the diattenuator 230 to now have the same E-field polarization, and their superposition generate fringes in intensity $I = (\varepsilon_0 C/2) \vec{E}_{sys}^\dagger \cdot \vec{E}_{sys}$ wherein $\vec{E}_{sys} = \vec{E}_{u,UUT} + \vec{E}_{u,Phase-modulated}$ per sampled area. The interference of the beam from the sample arm 227 with the phase-modulated beam from the reference arm 228 produces a spatial fringe pattern that encodes information about the surface topography of the UUT 228. The interference head 220 can include a fixture or mount 235 suitable for mounting the UUT 228. The mount 235 may include adjusting features to adjust the orientation of the UUT 228 with respect to the incoming sample beam. Although the phase modulated beam is provided to the reference arm 225 in the foregoing description, in another implementation it can be provided to the sample arm 227 instead.

The spatial fringe or interference patterns can be captured with the detector 232 (e.g., a camera) and analyzed. The camera frame rate can be any value up to current state of the art frame rates which may be tens of kilohertz or even higher. Frame integrations can be synchronized to phase settings performed by the EOM or phase shifter 216. For example, frame integration periods and subsequent readouts can be triggered based on drive signals applied to the phase shifter 216. The application of drive signals to the phase shifter 216 triggering of frame integration can be done in software. In an example implementation, several voltage values can be applied to the phase shifter 216 in succession to impart different amounts of phase shift to the optical wave passing through the phase shifter. After each voltage is applied, the camera can execute a frame integration to record the resulting interference pattern and the frame can be read out immediately.

The polarization-separated, phase-shifted interferometer 200 in FIG. 2A has several advantages over the conventional LUPI of FIG. 1A. To start, the polarization-separated, phase-shifted interferometer 200 has no moving parts, and the reference and sample beams are orthogonally polarized yet propagate along common optical paths, in part, until they reach the diattenuator 230 instead of interfering at the beam splitter 222. This makes the polarization-separated, phase-shifted interferometer 200 more robust and less susceptible to vibrations or temperature fluctuations. It also means that the light source 210, interference head 220, or both can be implemented monolithically to reduce sensitivity to shock and vibration.

In addition, the phase-shifting element (the phase shifter 216) and reference element (reference mirror 224) are physically separated and can be almost arbitrarily far apart. This allows the light source 210 to be thermally and mechanically isolated from the interference head 220, which might be moving. Further, the phase modulation can be implemented in fiber using EOMs that can operate at kHz, MHz, or even GHz rates with single-digit voltages instead of the much lower rates and much higher voltages for driving piezoelectric actuators. (The light source 210 can be implemented in fiber as shown in FIG. 2A or in free space if a spatial filter is used between the second and third PBSs to remove unwanted spatial phase information.)

Example Hardware Implementation

Figure 2C:
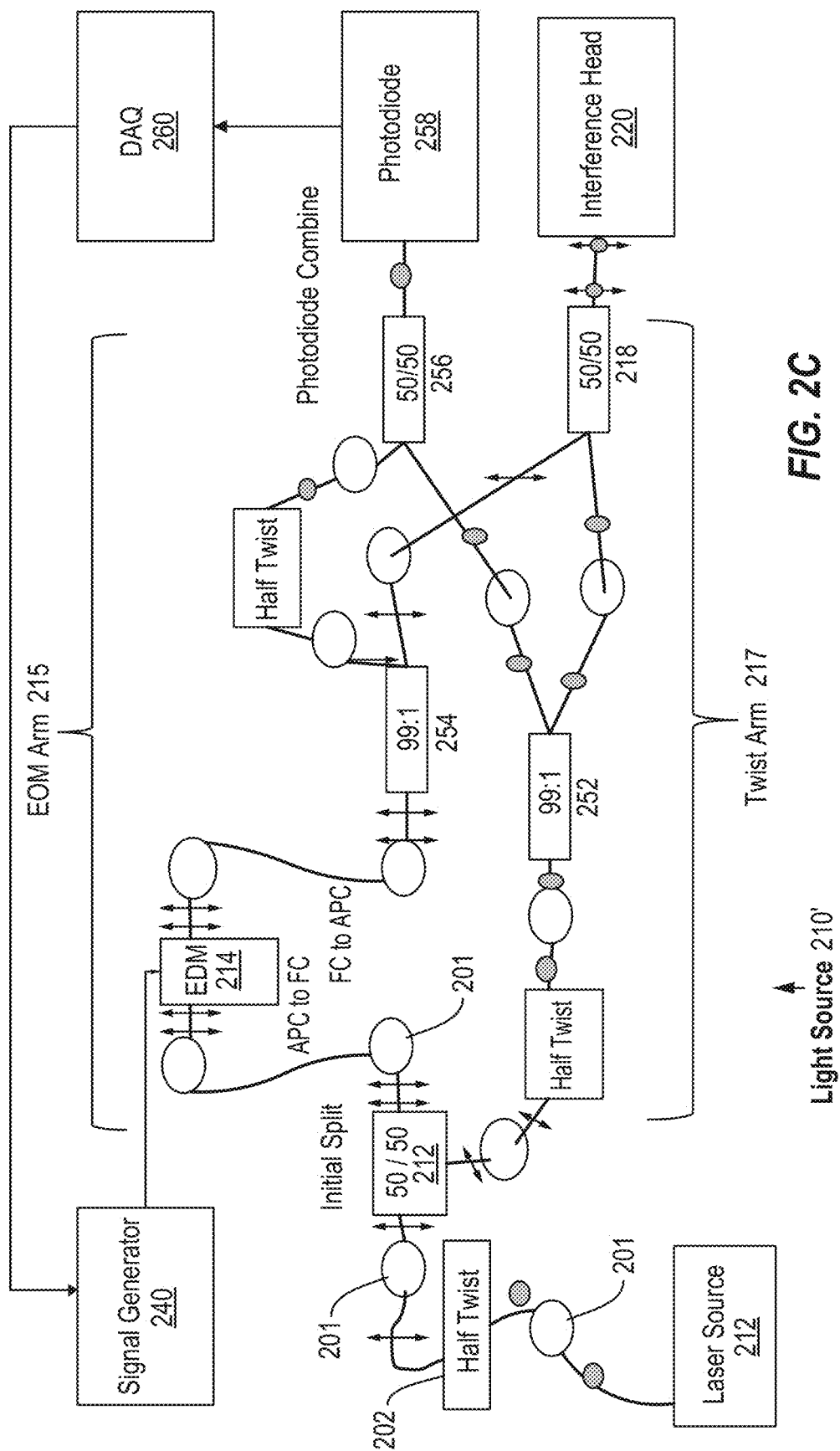
FIG. 2C shows a fiber-based light source for a polarization-separated, phase-shifted interferometer with closed-loop feedback control of the phase modulation.
Figure 2D:
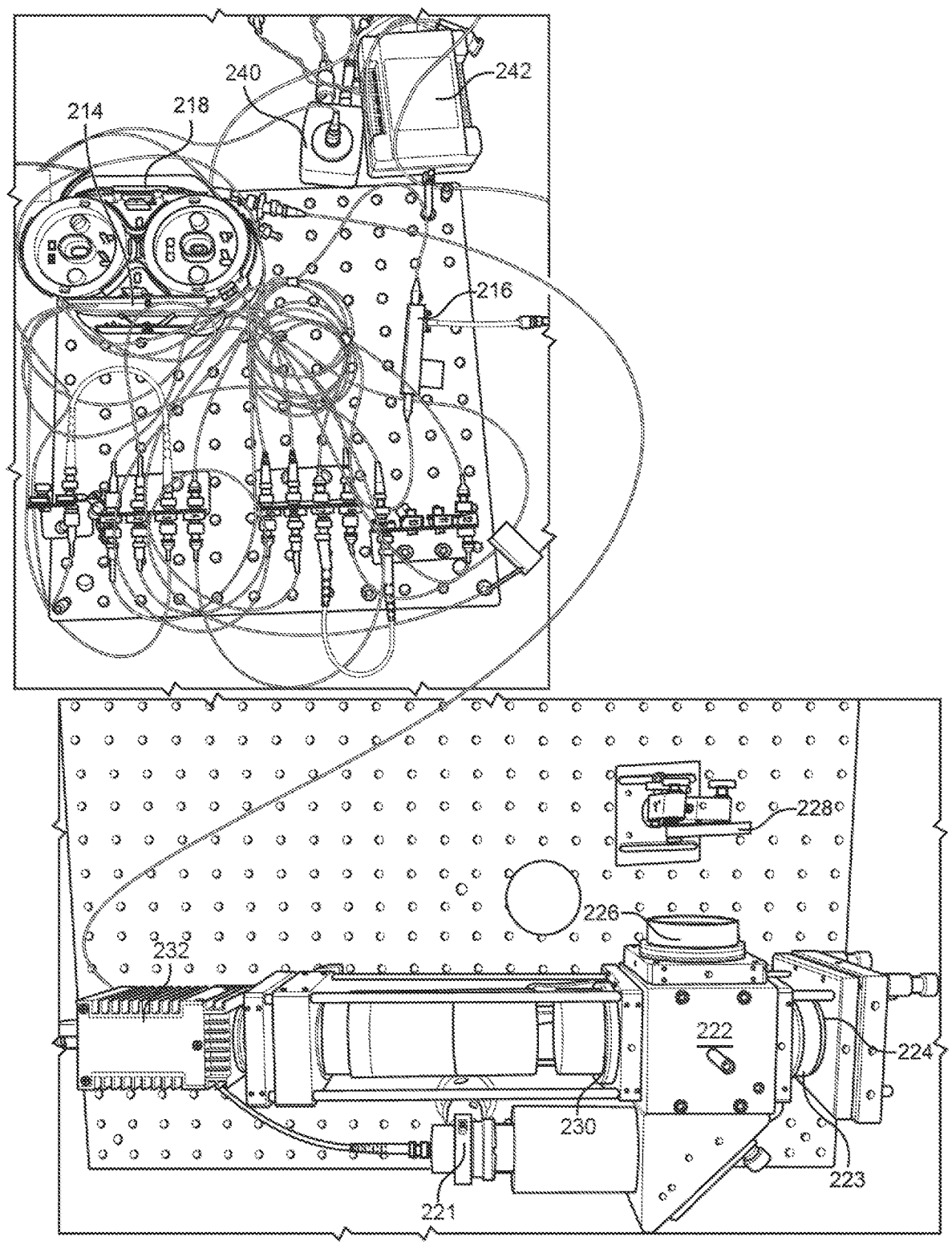
FIG. 2D shows an experimental implementation of the polarization-separated, phase-shifted interferometer of FIG. 2C.

FIG. 2C and FIG. 2D show an example hardware implementation of the polarization-separated, phase-shifted interferometer 200, with a modified light source 210' and interference head 220 on separate optical breadboards. In the modified light source 210', a laser 212 emits light of one polarization state into PM fiber. The light is fed through a first half-twist fiber 202 to rotate the polarization state and is then split to the EOM arm 215 and the twist/reference arm 217 with a 50/50 PM intensity splitter 214. Light in the EOM arm is fed into a phase modulator 216 driven by a signal generator 240 for relative phase control. Light in the twist arm 217 is sent through a second half twist fiber to set the polarization orthogonal to the light in the EOM arm 215. The final beam splitter 218 couples the orthogonally polarized outputs of the EOM arm 215 and twist arm 217 onto the same fiber for transmission to the interference head 220 via another length of PM fiber. There may be several connectors 201 in the light source to connect the fibers and couplers and EOM together.

The modified light source 210' can include a closed-loop feedback control of the phase imparted by the EOM 214 with additional beam splitters 252, 254, and 256; a photodiode 258; and data acquisition (DAQ) circuitry 260. This closed-loop feedback control compensates for any thermal, chromatic, or electrical imprecision of the EOM 212. The photodiode 258 is fast, e.g., it can operate at tens of kilohertz, which may be two orders of magnitude faster than the camera 232 in some implementations. To get light onto this photodiode 258, the beam splitters 252 and 254 siphon off 1% of the light from the EOM and twist arms 215, 217, respectively. A half-twist wave plate rotates the polarization state of one these beams so that both beams are in the same polarization state. A 50/50 beam splitter 256 combines the beams so that they interfere at the photodiode 258. This interference pattern is modulated by the relative phase shift imparted by the EOM 214 and possibly by absolute phase shifts that are not common to the light going to the interference head 220. The DAQ circuitry 260 determines whether the relative phase shifts match the target phase shifts to be applied by the EOM (e.g., 0, $\pi/4$, $\pi/2$, and $3\pi/2$) and adjusts the voltage of the drive signal from the signal generator 240 accordingly. The bandwidth of the phase-control feedback loop (e.g., a kilohertz or up to tens of kilohertz or higher) can be significantly greater than the timescale of disturbances in the light source 210 due to thermal drift (on the order of 0.1 Hz) or changes in fiber stress or mechanical disturbances (on the order of 10 Hz).

Both the phase-modulated and unmodulated, orthogonally polarized beams can be delivered from the light source 210 to the interference head 220 via a PM fiber. The PM fiber can have any length (e.g., even up to 1 kilometer or more) between the light source 210 and interference head 220. A portion of the PM fiber can be on a rotation mount to allow orientation of the fast/slow axis of the fiber with respect to the beam splitter 222 in the interference head 220. In a collimator 221, the fiber tip can be reimaged by a short aspheric lens to provide a higher f/# diverging beam, before being collimated by a second lens (e.g., a 2-inch-diameter, f/2 aspheric lens). These lenses in the collimator 221 can be chosen such that the beam intensity at the edge of an exit pupil at the collimator 221 is >50% of the intensity at the center. The beam can then be directed into the system so that it is incident on a beam splitter cube 222. In the example implementation, the beam splitter cube 222 has 2-inch square faces and is mounted in a cage with 3D printed cube positioners to seat and center the beam splitter cube at the desired height.

Light split by the beam splitter cube 222 passes through 2" polymer or glass wave plates 223 and 226. These wave plates 223, 226 sit in rotation mounts to allow them to be rotationally aligned to the axis of the beam splitter cube 222. The test (UUT) arm includes a UUT 228 about 4" away from the wave plate 223, whereas the reference mirror 224 is directly adjacent to the other wave plate 226. The laser's coherence length is large enough to not require adjustment of the length of the reference arm to improve fringe contrast.

After recombination at the beam splitter cube 222, the light passes through a linear polarizer 230 that is directly attached to the beam splitter cube 222, on another rotation mount. By adjusting the polarizer angle one can tailor the fringe contrast to compensate for low reflectivity in the UUT 228 or set both components equal for highly reflective test optics. The 3" tube segment following that allows for a lens cell with three 2" spherical lenses 241, 242, 243 (shown in FIG. 2E) chosen to provide high quality pupil imaging at 1550 nm, setting magnification to the desired value. At the start of the imaging lens tube is a 30 mm clipping aperture. While removing this aperture would allow for a much larger optic to be viewed (e.g., up to about 45 mm×32 mm) it could degrade the modulation transfer function (MTF), providing for blurred edges and unclear lateral features.

The camera 232 was an InGaAs device with 640×512 20-micron pixels, allowing for relatively fine spatial resolution imaging in the short-wave infrared (SWIR) region of the electromagnetic spectrum. The whole lens assembly was mounted in a threaded barrel to allow fine adjustment of focus. Other suitable cameras include silicon devices that detect light at other wavelengths, e.g., 1064 nm, 808 nm, or 633 nm, which could be used for the light source 210.

Figure 2E:
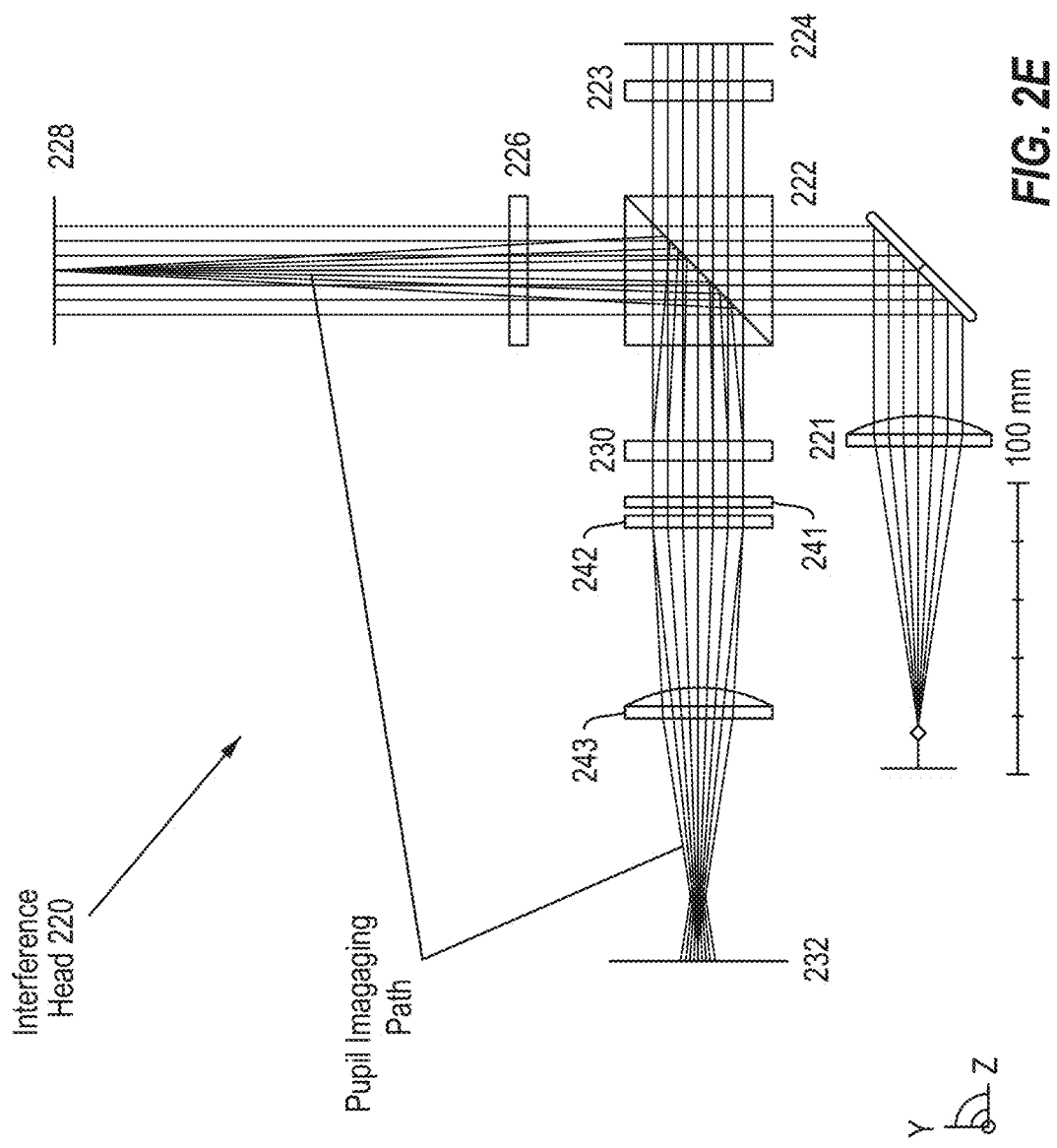
FIG. 2E is a ray-trace diagram of the interference head shown in FIG. 2D.

FIG. 2E is a ray-trace diagram of the interference head 220 as implemented in FIG. 2D. The pupil imaging path should be designed with appropriate image scaling and offsets and to prevent well-imaged ghosts from surfaces other than the surface being inspected of the UUT 228. One or more lenses can be used to image the surface under test onto the detector so that visible surface features (e.g., edges of the UUT 228) can be seen superimposed with the fringes pattern. For the illustrated example, three lenses are used to improve image quality.

Again, the polarization-separated, phase-shifted interferometer 200 has several advantages over other interferometers. First, there are no moving components in the polarization-separated, phase-shifted interferometer 200. The components throughout the entire structure can be locked and glued to a rigid substrate. For example, the wave plates, reference mirrors, and polarizers can be face-bonded onto a single monolithic core (e.g., a plate of aluminum or other solid substrate) for added rigidity and robustness.

Second, the polarization-separated, phase-shifted interferometer 200 can be readily switched between a polarization-splitting mode and an intensity-splitting mode by rotating the input polarization states to allow an equal portion of both polarizations into each arm (e.g., by rotating the input fiber by 45°), creating a standard intensity-splitting QWP interferometer. In intensity-splitting mode, a mirror mounted on a piezoelectric actuator or other phase shifter in the reference arm can change the relative phase between arms in the interference head, as the in-line phase delay generated in the light source would pass to both arms in the interference head. Both the polarization-splitting and intensity-splitting modes can be used by incorporating a motorized rotation mount or a flip-in wave plate into the interferometer.

Third, the polarization-separated, phase-shifted interferometer 200 can be compact. The light source 210 and interference head 220 can be manufactured in a single assembly or package having a volume no larger than a cube measuring 18 cm on a side with a clear aperture for a UUT that is over 20 mm. This volume is significantly smaller than conventional LUPI devices for clear apertures of comparable sizes.

Reconstructing Surface Maps from Interferograms

The map of the surface of the UUT can be derived as follows. Each interferogram can be assigned x and y directions (e.g., along pixel rows and columns). The fringes detected by the camera in the x direction can be expressed as:

$$I_k(x) = a(x) + n(x) + b(x)\cos(\phi(x) + \delta_k), \; k = 1, 2 \ldots N \quad (1)$$

where a is the background level or intensity offset, n is noise, b is amplitude of the intensity modulation in the fringe pattern, $\phi$ is the phase front value to be determined, and $\delta_k$ is the applied phase shift (i.e., the relative phase imparted by the EOM in the light source). To simplify the description, only the x direction is discussed with it being understood that the analysis applied to x and y directions in practical implementations. If the phase shifts $\delta_k$ are known for each interferogram, then the surface map can be reconstructed from the interferograms using an N-step phase-shift, least squares (non-linear phase shift), or other suitable processing technique. In practice N can be 3 or more.

The N-step phase-shift technique is an extension of the three- and four-step phase-shift techniques and proceeds as follows. The discrete phase shifts can be:

$$\delta_k = p\frac{2\pi}{N}(k-1), \; k = 1, 2, \ldots, N \quad (2)$$

where p is the number of fringes sampled and is larger than 1. The fringe pattern is then split into three separable functions:

$$I_k(x) = c_1(x)f_1(k) + c_2(x)f_2(k) + c_3(x)f_3(k)$$

$$c_1 = a(x)f_1 = 1$$

$$c_2 = b(x)\cos(\phi(x))f_2 = \cos(\delta_k)$$

$$c_3 = b(x)\sin(\phi(x))f_3 = -\sin(\delta_k) \quad (3)$$

It can be shown that the functions $f_1, f_2, f_3$ are orthogonal over integer numbers of waves. Therefore, the coefficients $c_1$, $c_2$, $c_3$ can be recovered using the inner product and the phase (surface) map of the UUT can be recovered as:

$$\phi(x) = -\mathrm{atan}\left(\frac{\sum^n I_k \sin(\delta_k)}{\sum^n I_k \cos(\delta_k)}\right). \quad (4)$$

The N-step phase-shift method is exact and numerically efficient but is based on assumptions that limit its practical usefulness. The separable functions that define the intensity assume negligible noise and therefore in a real system will possess error. Generally, knowledge of the phase is needed, and precise phase control is useful in order to know the phase shifting is correct. Preferably, the phase shift should be essentially linear, which for a real EOM can be challenging.

Figure 3A:
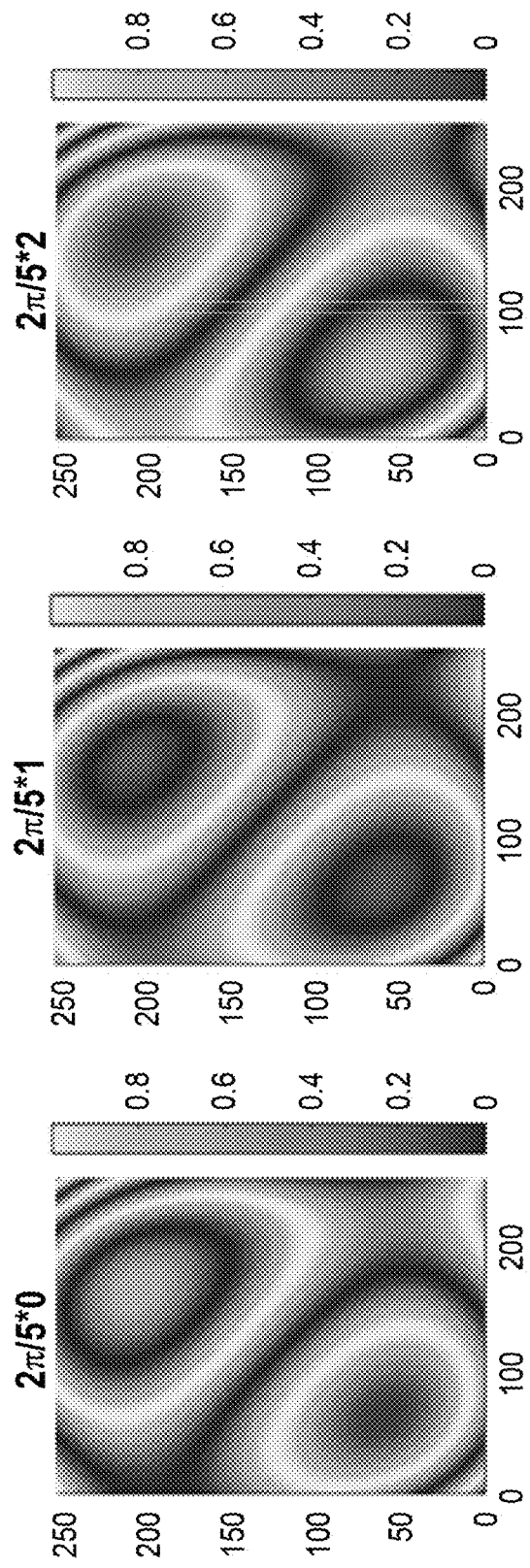
FIG. 3A shows five simulated interferograms acquired at phase steps of 0, $2\pi/5$, $4\pi/5$, $6\pi/5$, and $8\pi/5$ with a polarization-separated, phase-shifted interferometer.
Figure 3A:
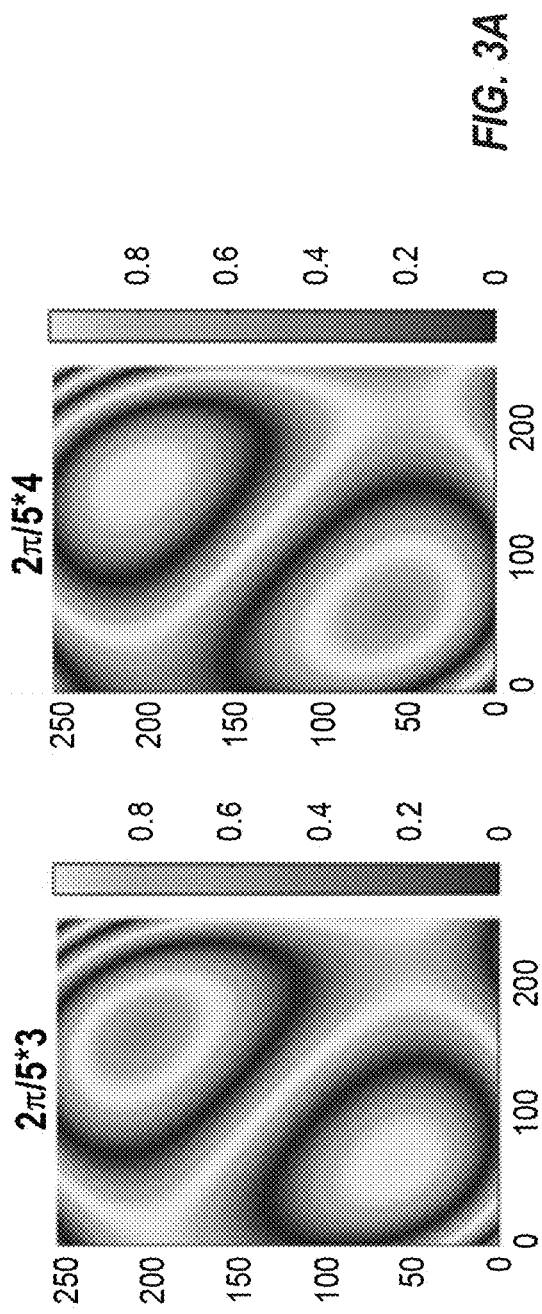
Figure 3B:
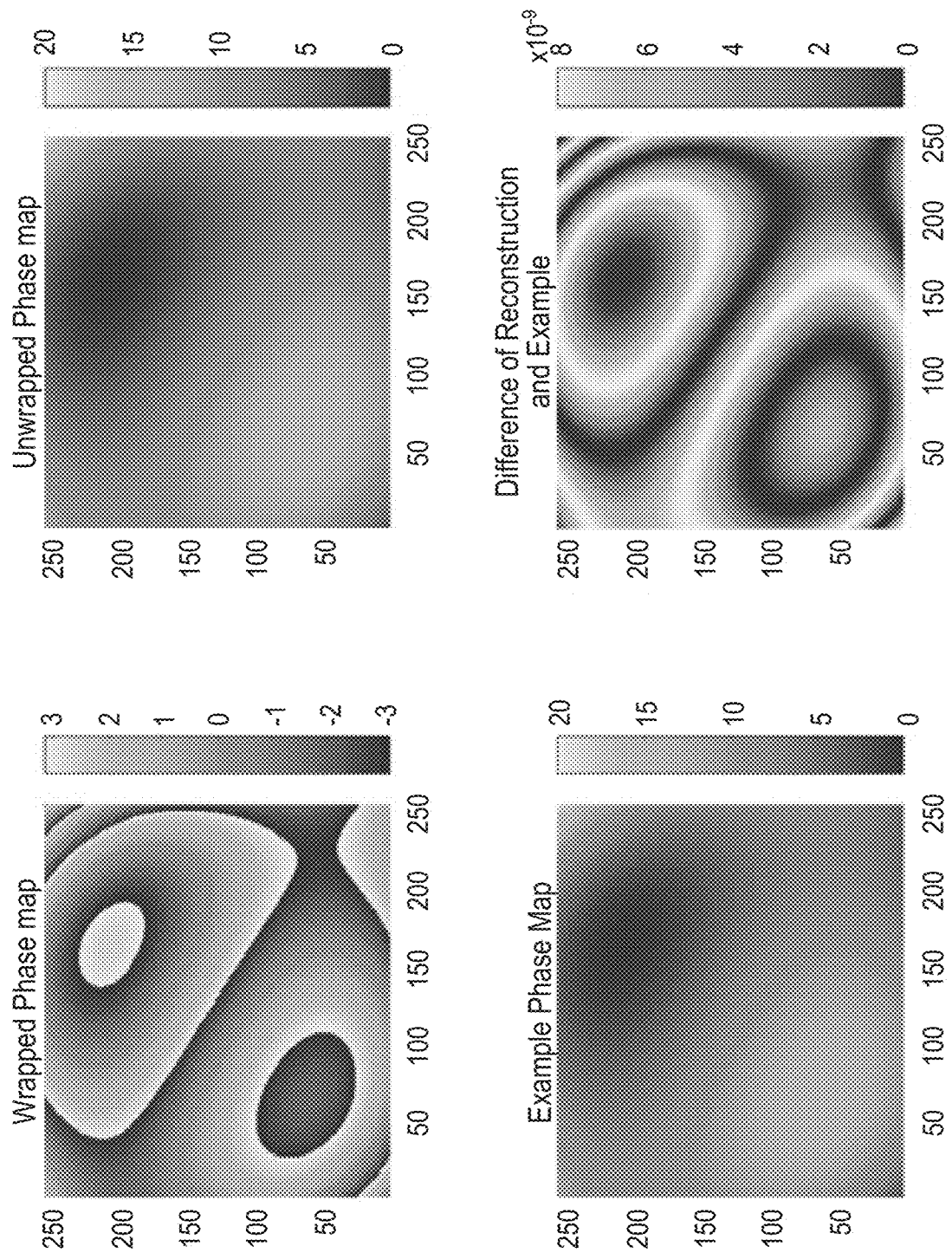
FIG. 3B shows, clockwise from lower left, an example phase map, wrapped phase map, unwrapped phase map, and difference between the reconstructed and example phase maps for the interferograms of FIG. 3A without any noise.
Figure 3C:
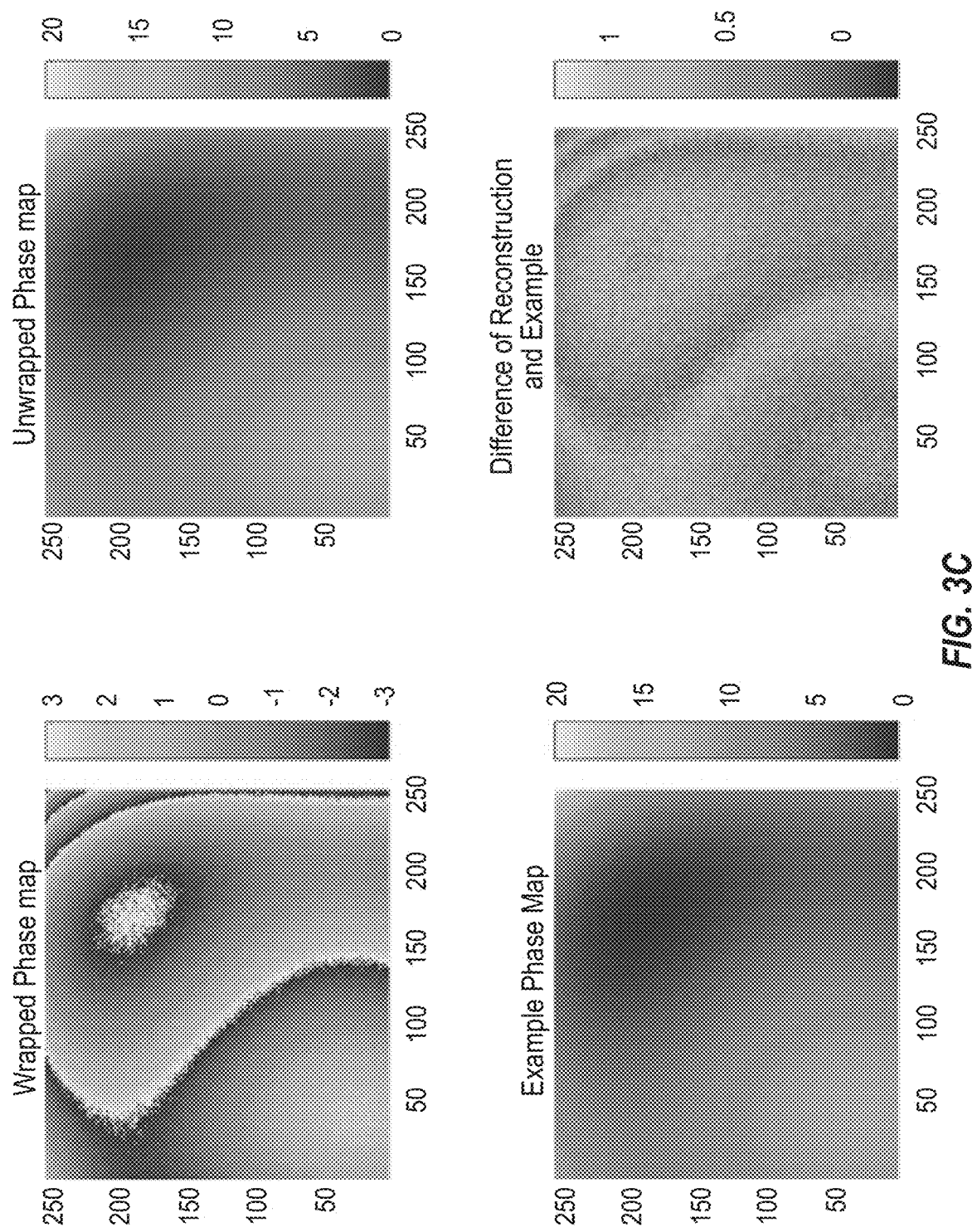
FIG. 3C shows, clockwise from lower left, an example phase map, wrapped phase map, unwrapped phase map, and difference between the reconstructed and example phase maps for the interferograms of FIG. 3A with 10% phase noise.

FIGS. 3A-3C illustrate results from a simulation of the N-step phase-shift method applied to five interferograms acquired at phase steps of 0, 2π/5, 4π/5, 6π/5, and 8π/5 (FIG. 3A) with a polarization-separated, phase-shifted interferometer. FIG. 3B shows, clockwise from lower left, an example phase map that would be imparted by a corresponding surface profile, wrapped phase map, unwrapped phase map that reconstructs the example phase map, and difference between the reconstructed and example phase maps for the interferograms of FIG. 3A without any noise. The maximum phase difference is on the order of $10^{-8}$ radians, which would correspond to a surface topography error that is a small fraction of a nanometer. FIG. 3C shows, clockwise from lower left, an example phase map, wrapped phase map, unwrapped phase map, and difference between the reconstructed and example phase maps for the interferograms of FIG. 3A with 10% phase noise. The extra phase noise increases the phase difference to about 1 radian (or about 250 nanometers).

One limitation of the N-step phase-shift process is that it uses N linearly spaced phase shift points. In a more realistic case, the phase shifts may be quasi-regularly spaced due to variations from thermal and environmental perturbations. However, the least squares method of wavefront reconstruction is at its heart a matrix minimization that solves the same equations as in the linear phase shift case for nonlinearly spaced phase shifts.

Consider taking M frames of data (interferograms), where each frame has P pixels. The data can be represented by the form:

$$I = \begin{pmatrix} I_1(x_1) & I_1(x_2) & \ldots & I_1(x_P) \\ I_2(x_1) & I_2(x_2) & \ldots & I_2(x_P) \\ \vdots & \vdots & \ddots & \vdots \\ I_M(x_1) & I_M(x_2) & \vdots & I_M(x_P) \end{pmatrix} \quad (5)$$

From these data points the information to be recovered is, as before, the phase of the data, $\phi(x)$. This recovery also yields $a(x)$, the amplitude offset of the data, and $b(x)$, the amplitude of the phase function. Two additional matrices are defined to solve for these amplitudes:

$$A = \begin{pmatrix} 1 & \cos\delta_0 & -\sin\delta_0 \\ 1 & \cos\delta_1 & -\sin\delta_1 \\ \vdots & \vdots & \vdots \\ 1 & \cos\delta_M & -\sin\delta_M \end{pmatrix} \quad (6)$$

$$C = \begin{pmatrix} a_1(x_1) & \ldots & a_P(x_P) \\ b_1(x_1)*\cos\phi_1(x_1) & \ldots & b_P(x_P)*\cos\phi_P(x_P) \\ b_1(x_1)*\sin\phi_1(x_1) & \ldots & b_P(x_P)*\sin\phi_P(x_P) \end{pmatrix}, \quad (7)$$

where $\delta_m$ represents phase shifts of arbitrary magnitudes. These equations are set up such that:

$$I = A*C \quad (8)$$

The matrix C can be found via a least-squares solution:

$$C = (A^T*A)^{-1}*A^T*I \quad (9)$$

After finding the matrix solution for C, the columns of C represent the solutions for the a, b, and $\phi$ values for each pixel in the M interferogram frames. These can be recovered from the values in the first, second, and third rows of C. For example, the a, b, and $\phi$ values for the first pixel of the first frame (corresponding to $I_1(x_1)$ above) can be recovered as follows:

$$a(x) = a_1(x) \quad (10)$$

Thus, the first row of matrix C directly represents the offset. The root sum square of the second and third row of C represents the b amplitude:

$$b(x) = \sqrt{(b_1(x)*\cos\phi_1(x))^2 + (b_1(x)*\sin\phi_1(x))^2} \quad (11)$$

The phase term is given by the arctangent of the quotient of the third and second rows of the matrix.

$$\phi(x) = \tan^{-1}\frac{b_1(x)*\sin\phi_1(x)}{b_1(x)*\cos\phi_1(x)} \quad (12)$$

The phase value found in EQ. 12 is the phase value for the pixel that is used to determine surface topography. Additional details of interferogram analysis can be found in the publication, "Generalized data reduction for heterodyne interferometry," J. E. Greivenkamp, *Optical Engineering*, Vol. 23, No. 4 (1984), which technical discussion is herein incorporated by reference in its entirety.

Figure 4A:
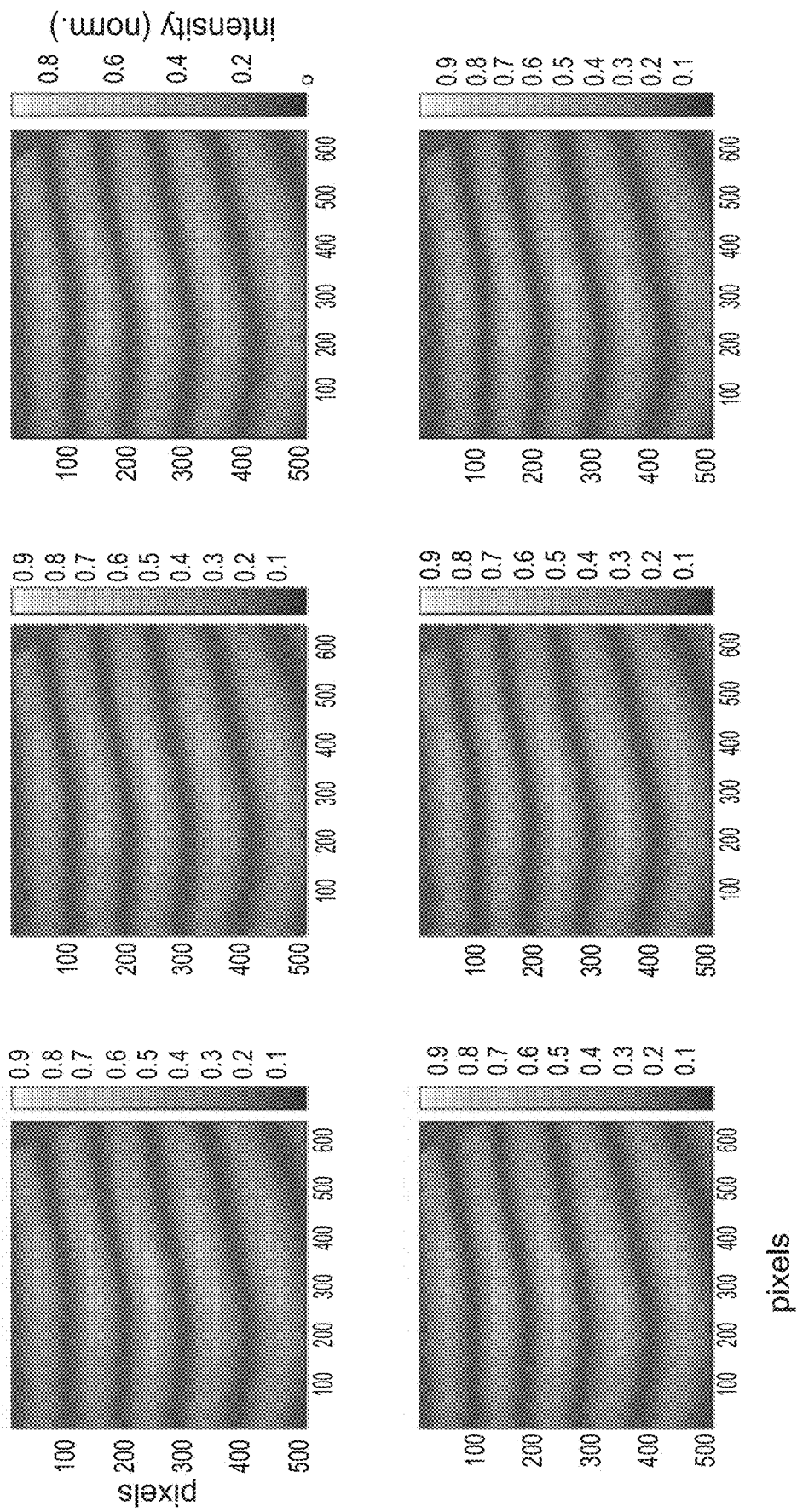
FIG. 4A shows interferograms of a test object obtained at different unknown phase shifts using a polarization-separated, phase-shifted interferometer.
Figure 4B:
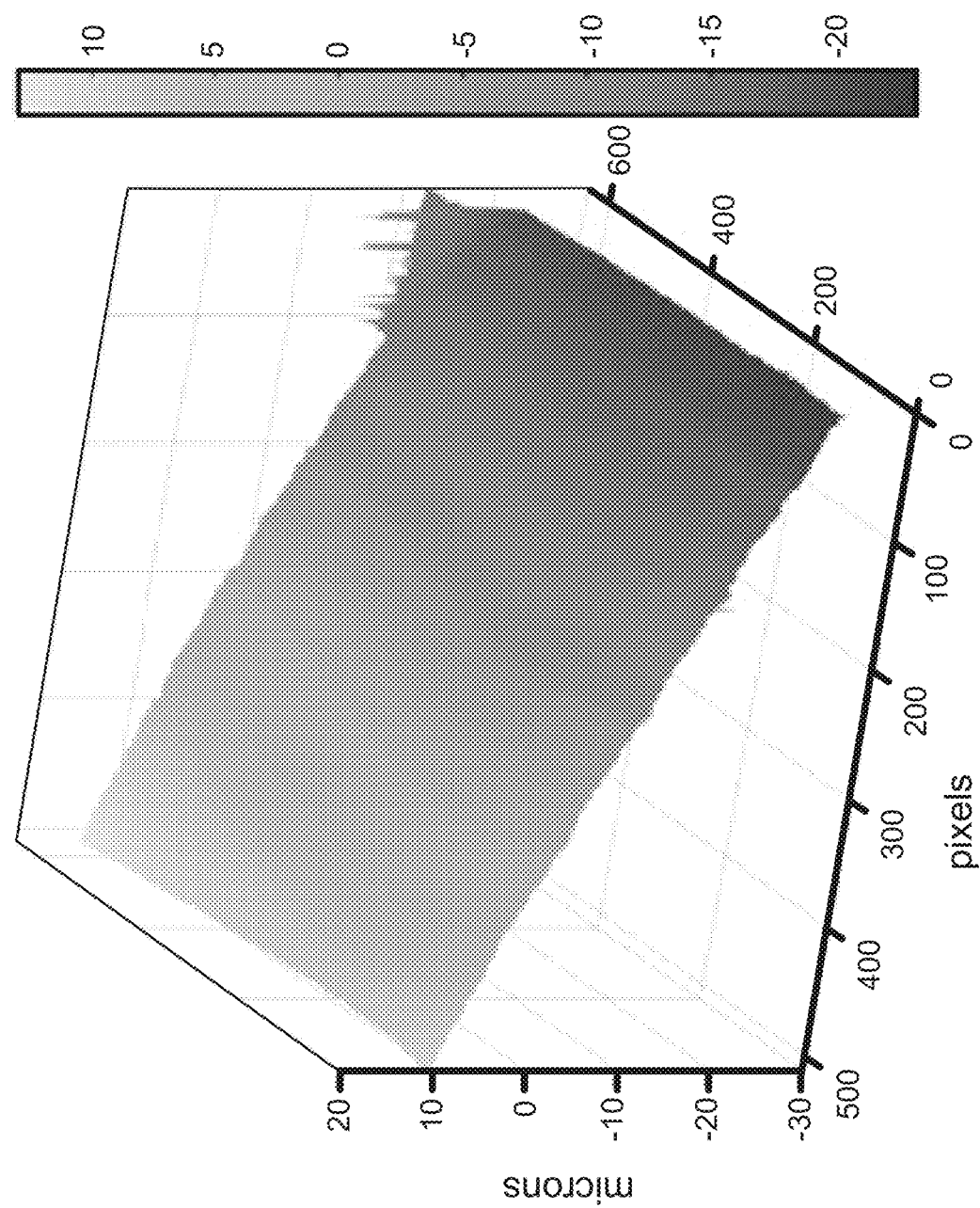
FIG. 4B shows a surface map of the test object reconstructed numerically from the interferograms of FIG. 4A.
Figure 4C:
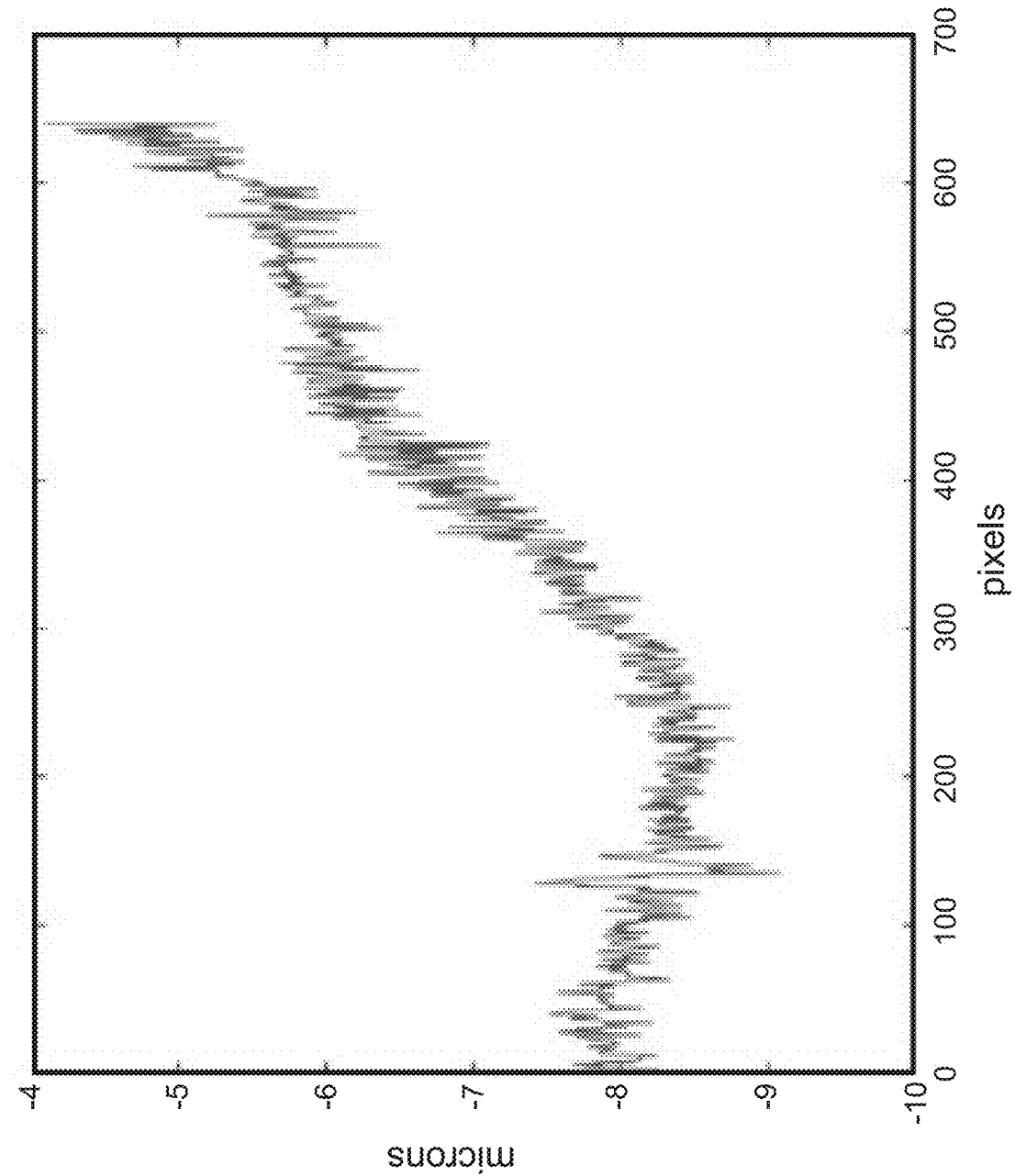
FIG. 4C is a slice of the surface map of FIG. 4B.

FIGS. 4A-4C illustrate that numerical phase calculations, following the process outlined in EQ (5) through EQ (12) above, can be used to recover a phase profile and topography of a UUT 228 when nominally fixed and known phase shifts are applied to the EOM but the resulting phases shifts are unknown and arbitrary because of nonlinearities of the EOM and perturbations in the splitter/combiner 207. FIGS. 4B and 4C show the fringe patterns of FIG. 4A converted into a wavefront profile reflected from the UUT 228. The horizontal scales in FIG. 4B and FIG. 4C are pixels (having a 20-micron pixel pitch) and the vertical scales are microns. The fringe patterns in the interferograms are dominated by tilt, though some curvature is present. What is not immediately evident from the fringe images, but emerges on processing, is the degree of cross-frame tilts and curvature. This shows that the data processing pipeline is successfully converting multi-frame fringe imagery into a wavefront reflected from the UUT 228, from which topography of the UUT 228 can be found.

Figures 5A, 5B, 5C:
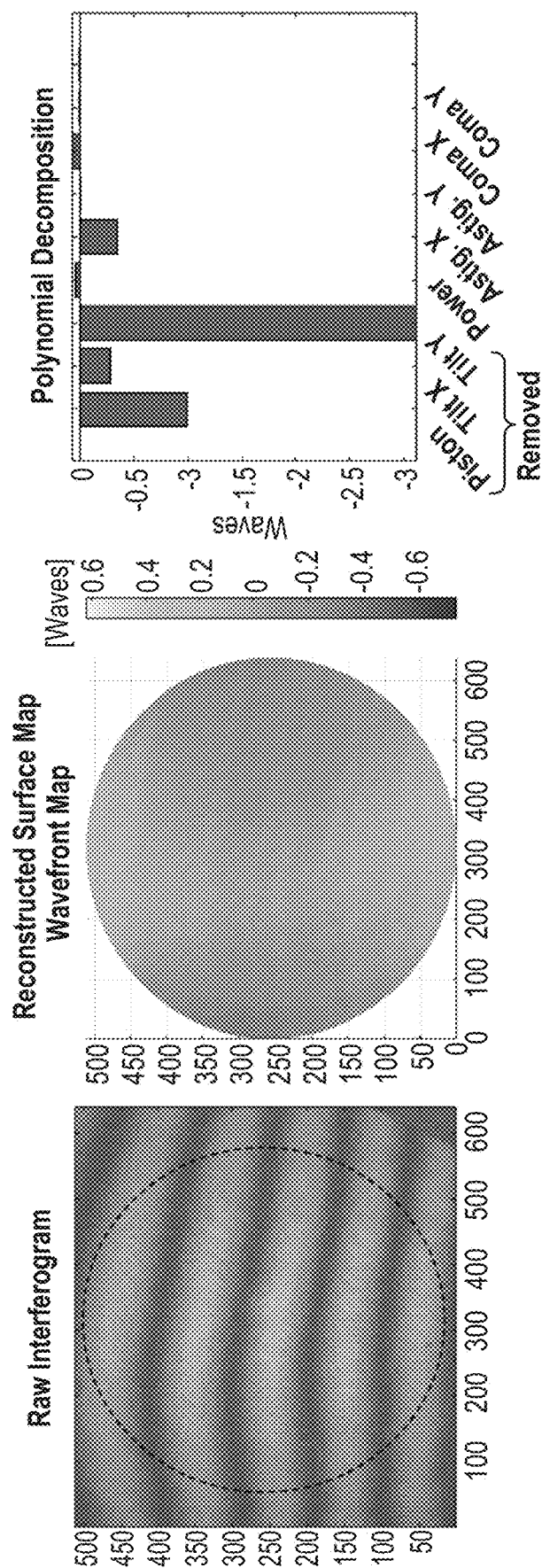
FIG. 5A shows an interferogram of a curved, tilted filter obtained using a polarization-separated, phase-shifted interferometer.
FIG. 5B shows a surface map of the filter of FIG. 5A reconstructed from interferograms at different relative phase shifts obtained using a polarization-separated, phase-shifted interferometer.
FIG. 5C is a bar graph of the Zernike polynomial coefficients from the surface map of FIG. 5B.

Experimental Measurements with a Polarization-Separated, Phase-Shifted Interferometer FIGS. 5A-5C illustrate a data processing pipeline that takes in interferograms acquired by a polarization-separated, phase-shifted interferometer and outputs surface data. FIG. 5A shows an interferogram of an optical filter with a known curvature placed in the sample/test arm of the polarization-separated, phase-shifted interferometer. The fringes are dominated by tilt due to slight misalignment of the filter's surface from the phase fronts of the optical beam. Applying the least-squares phase map retrieval process on a series of interferograms acquired by the polarization-separated, phase-shifted interferometer at different relative phase shifts and removing the tilt due to misalignment yields a reconstruction of the filter's surface as shown in FIG. 5B. The wavefront map shows clear astigmatism, both to the naked eye and when broken into constituent Zernike polynomials plotted in FIG. 5C, indicating astigmatism in the reflected beam's wavefront and a saddle-like curvature of the surface.

FIG. 6A and FIG. 6B show surface maps of the same filter acquired with a commercial interferometer (the AccuFiz interferometer available from 4D Technology Corporation of Tucson, Arizona) and the polarization-separated, phase-shifted interferometer, respectively. The surface map acquired by the 4D Technology AccuFiz interferometer has a P-V wavefront error of 2.18 microns. The surface map acquired by the polarization-separated, phase-shifted interferometer has a measured P-V wavefront error of 2.15 microns, representing a functionally identical measurement.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An interferometric measurement apparatus comprising:
   a light source to generate a reference beam in a first polarization state and a sample beam in a second polarization state orthogonal to the first polarization state and having a fiber-coupled phase modulator to shift a phase of the reference beam with respect to the sample beam;
   a beam collimator including at least one lens arranged to receive light from a fiber exiting the light source and produce a first beam intensity at an edge of an exit pupil of the beam collimator that is at least 50% of a second beam intensity at a center of the exit pupil; and
   an interference head to receive the reference beam and the sample beam from the beam collimator and to interfere the sample beam with the reference beam after propagating the reference beam along a first optical path and the sample beam along a second optical path in the interference head.

2. The interferometric measurement apparatus of claim 1, wherein the interference head comprises:
   a polarizing beam splitter (PBS) to receive the reference beam from the first optical path, receive the sample beam from the second optical path, and combine the reference beam and sample beam onto an output optical path;
   a mirror in the first optical path;
   a first quarter wave plate (QWP), in the first optical path between the PBS and the mirror, to transform the reference beam from the first polarization state to the second polarization state after reflection of the reference beam from the mirror and a second pass of the reference beam through the first QWP;
   a mount in the second optical path to hold a unit under test;
   a second QWP, in the second optical path, to transform the sample beam from the second polarization state to the first polarization state after reflection of the sample beam off a surface of the unit under test when placed in the mount and a second pass of the sample beam through the second QWP;
   a polarization analyzer, in the output optical path, to project the sample beam and the reference beam into a third polarization state; and
   a detector, in the output optical path, to detect interference of the sample beam and the reference beam.

3. The interferometric measurement apparatus of claim 2, further comprising;
   at least one lens to image the unit under test, when mounted in the mount, onto the detector.

4. The interferometric measurement apparatus of claim 1, wherein the reference beam and sample beam co-propagate along a same optical path when exiting the light source.

5. The interferometric measurement apparatus of claim 2, wherein the PBS, the first QWP, the second QWP, the mirror, the polarization analyzer, and the detector are assembled in a monolithic assembly.

6. The interferometric measurement apparatus of claim 1, wherein the light source comprises a laser to emit polarized light.

7. The interferometric measurement apparatus of claim 6, wherein the fiber-coupled phase modulator comprises at least one of an electro-optic phase modulator, an acousto-optic modulator, a fiber stretcher, a thermal index modifier, a liquid-crystal wave plate, or an optical trombone.

8. The interferometric measurement apparatus of claim 6, wherein the fiber-coupled phase modulator is configured to shift a phase of either the sample beam or the reference beam while transmitting both the sample beam and the reference beam.

9. The interferometric measurement apparatus of claim 6, wherein the light source further comprises:
a first PBS, in optical communication with the laser and the fiber-coupled phase modulator, to split the polarized light into the sample beam and the reference beam and to direct one of the sample beam or the reference beam to the fiber-coupled phase modulator; and
a second PBS, in optical communication with the first PBS and the fiber-coupled phase modulator, to direct the sample beam and the reference beam to a common output.

10. The interferometric measurement apparatus of claim 9, wherein the laser, the first PBS and the second PBS are fiber-coupled.

11. The interferometric measurement apparatus of claim 6, wherein the light source further comprises:
a beam splitter, in optical communication with the fiber-coupled phase modulator, to split off a portion of an output of the fiber-coupled phase modulator;
a photodetector, in optical communication with the beam splitter, to detect the relative phase between the sample beam and the reference beam from at least the portion of the output of the fiber-coupled phase modulator; and
circuitry, operably coupled to the photodetector and the fiber-coupled phase modulator, to adjust a signal driving the fiber-coupled phase modulator to compensate for error in the relative phase detected by the photodetector.

12. A method of operating an interferometric measurement apparatus, the method comprising:
generating, with a light source, a reference beam in a first polarization state and a sample beam in a second polarization state orthogonal to the first polarization state;
shifting a phase of the reference beam with respect to the sample beam with a fiber-coupled phase modulator in the light source before providing the reference beam and the sample beam to an interference head of the interferometric measurement apparatus;
receiving, by at least one lens in a beam collimator, light from a fiber exiting the light source;
producing a first beam intensity at an edge of an exit pupil of the beam collimator that is at least 50% of a second beam intensity at a center of the exit pupil;
directing, in the interference head, the reference beam along a first optical path that includes a mirror;
directing, in the interference head, the sample beam along a second optical path that includes a unit under test; and
interfering the reference beam returned from the mirror with the sample beam returned from the unit under test.

13. The method of claim 12, further comprising:
co-propagating the reference beam and the sample beam from the light source along a common optical path from the light source to the interference head.

14. The method of claim 13, wherein the common optical path is in polarization maintaining fiber.

15. The method of claim 12, further comprising:
recording, from the interfering reference beam and sample beam, a plurality of different interference patterns for a plurality of different phase shifts produced by the fiber-coupled phase modulator without adjusting the phase with a moving mirror or other phase-modulating component in either the first optical path or the second optical path; and
analyzing the plurality of interference patterns to determine surface topography of the unit under test.

16. The method of claim 12, further comprising:
coupling polarized light from a laser to the fiber-coupled phase modulator in the light source;
passing two orthogonal components of the polarized light through the fiber-coupled phase modulator; and
shifting the phase of only a first component of the two orthogonal components with the fiber-coupled phase modulator to produce the reference beam.

17. The method of claim 12, further comprising:
coupling polarized light from a laser to first polarizing beam splitter (PBS) in the light source;
splitting the polarized light with the PBS into the reference beam and the sample beam;
and combining, with a second PBS, the reference beam output from the fiber-coupled phase modulator with the sample beam onto a common optical path that couples to the interference head.

18. The method of claim 12, further comprising:
combining a portion of the reference beam that is split off after the fiber-coupled phase modulator with a portion of the sample beam in the light source;
detecting, with a photodetector, a relative phase between the sample beam and the reference beam from the combined portion of the reference beam and the portion of the sample beam in the light source; and
adjusting, with feedback circuitry, a signal driving the fiber-coupled phase modulator to compensate for error in the relative phase detected by the photodetector.

* * * * *